Feb. 22, 1938. J. M. BOYKOW 2,109,283
INSTRUMENT FOR INDICATING NAVIGATIONAL FACTORS
Filed Jan. 10, 1934 17 Sheets-Sheet 2
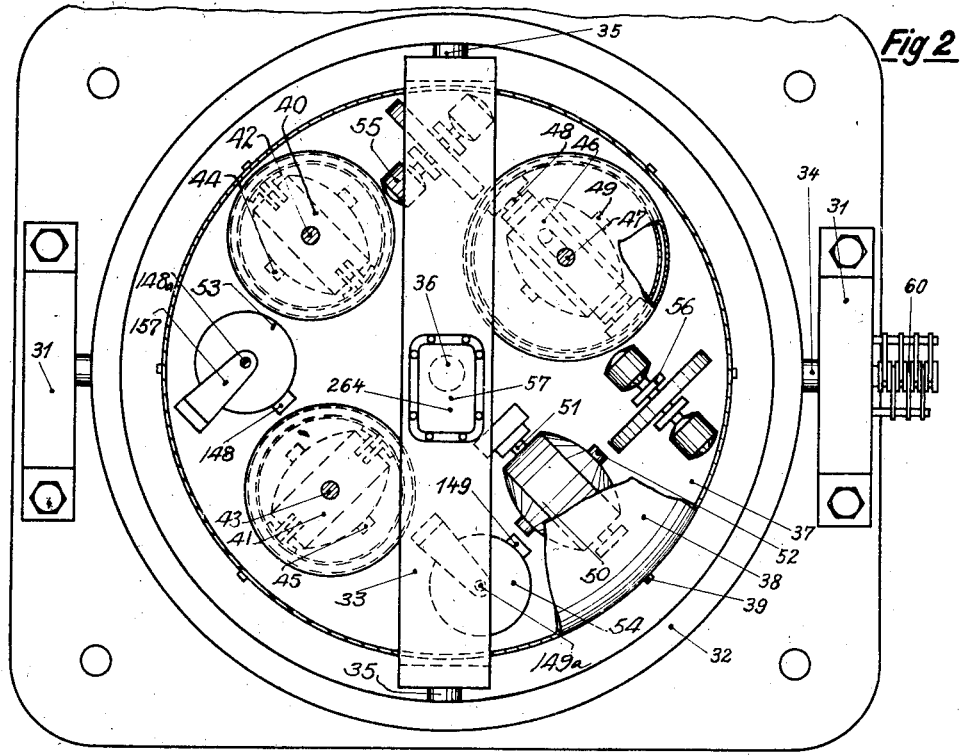
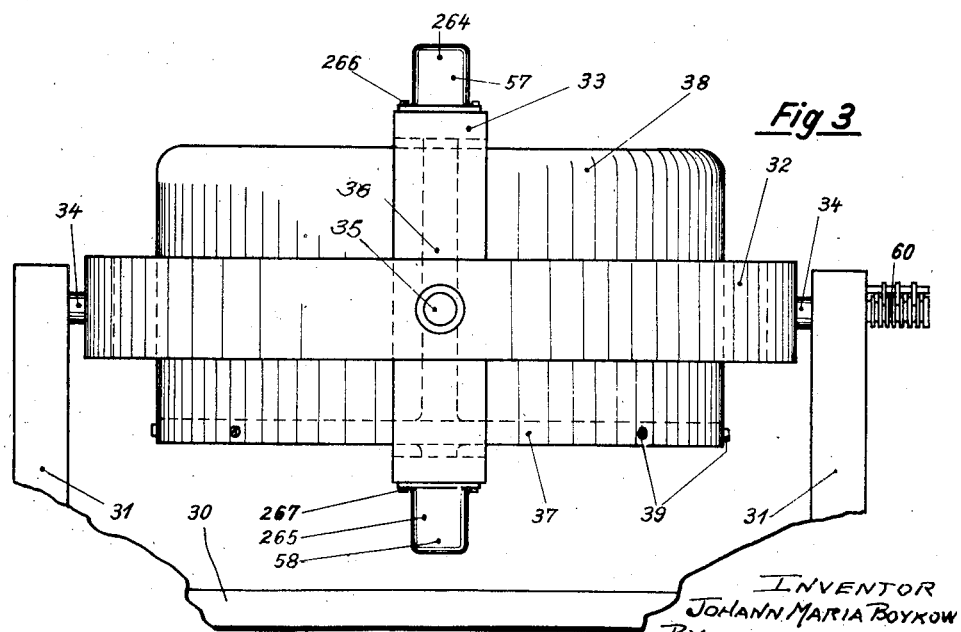
INVENTOR
JOHANN MARIA BOYKOW
BY
ATTORNEYS

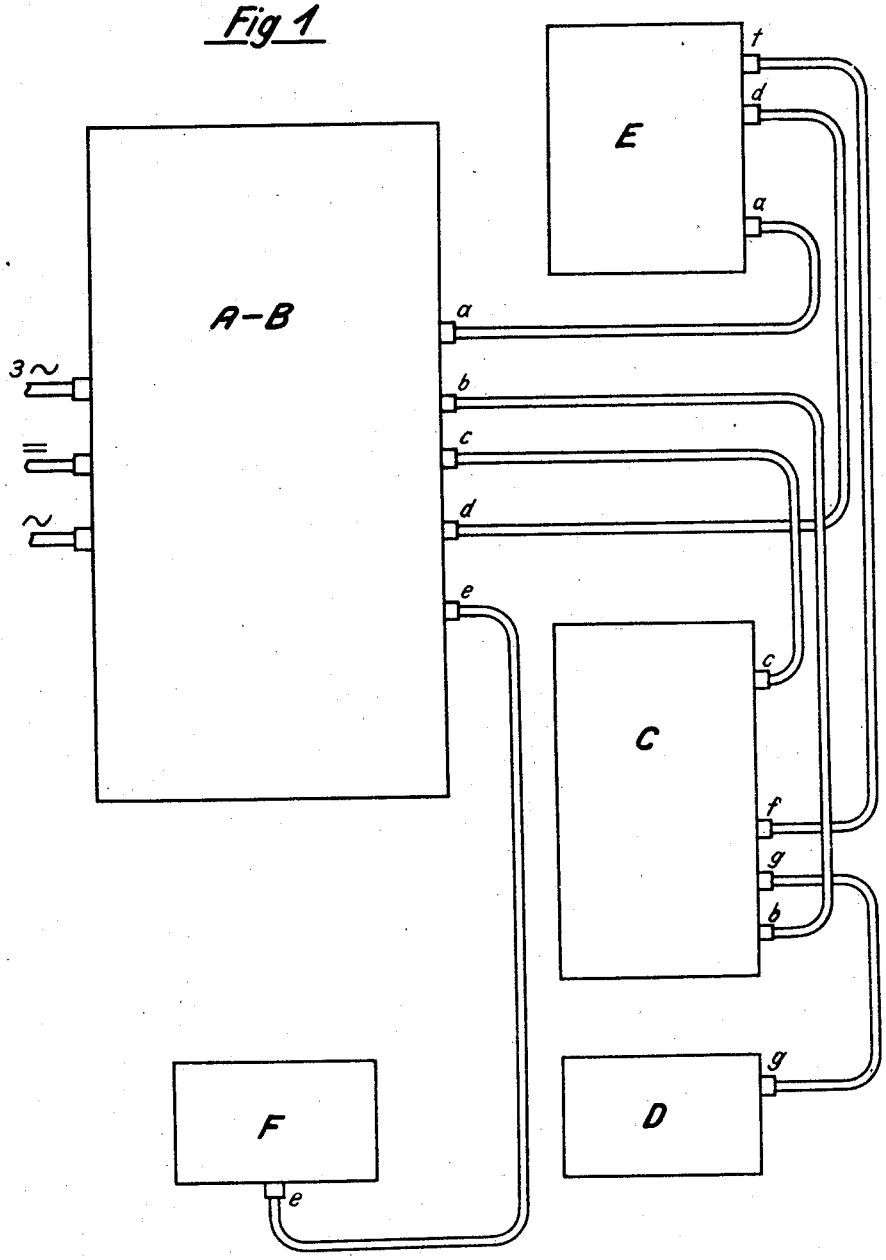

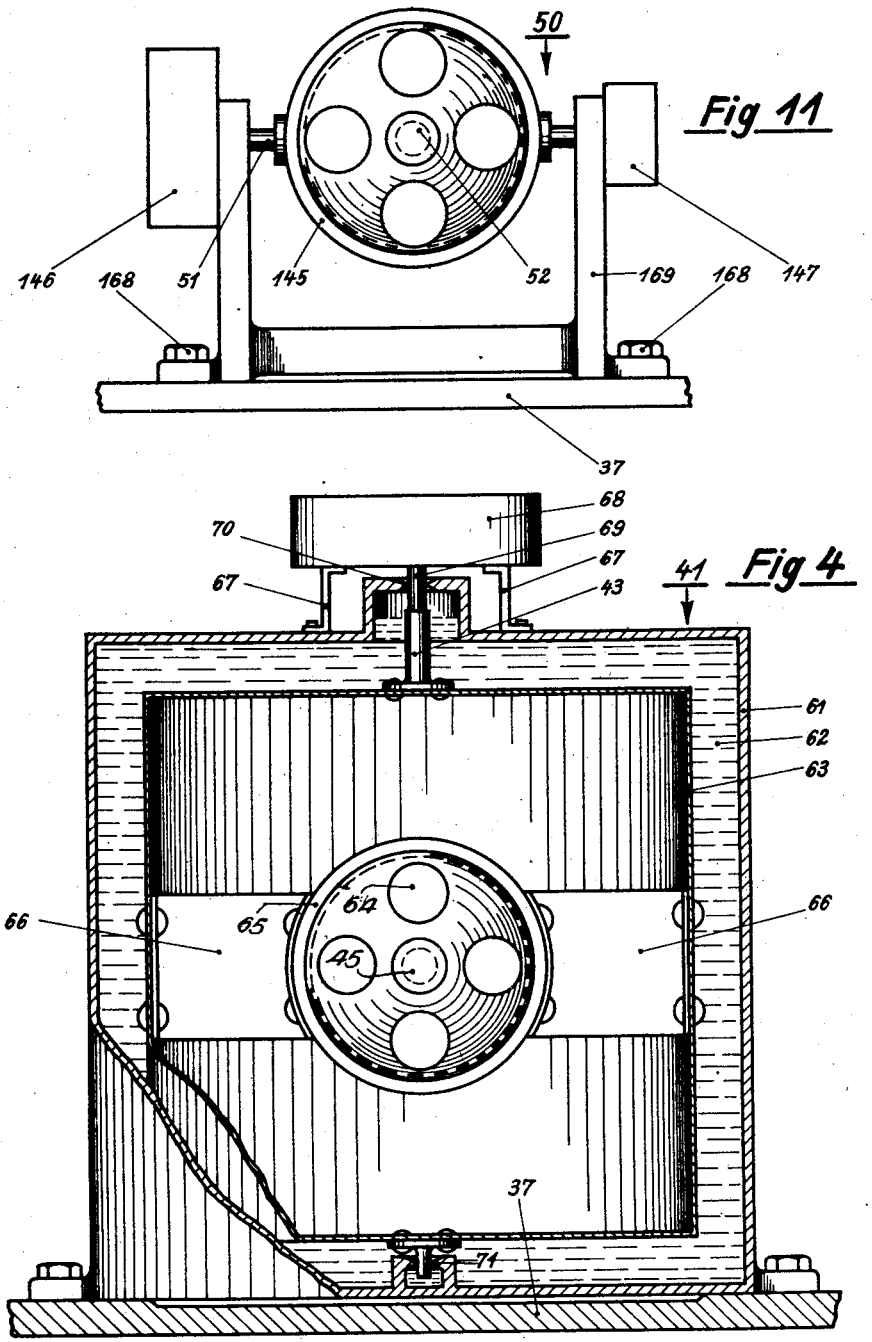

Feb. 22, 1938.  J. M. BOYKOW  2,109,283
INSTRUMENT FOR INDICATING NAVIGATIONAL FACTORS
Filed Jan. 10, 1934  17 Sheets-Sheet 4
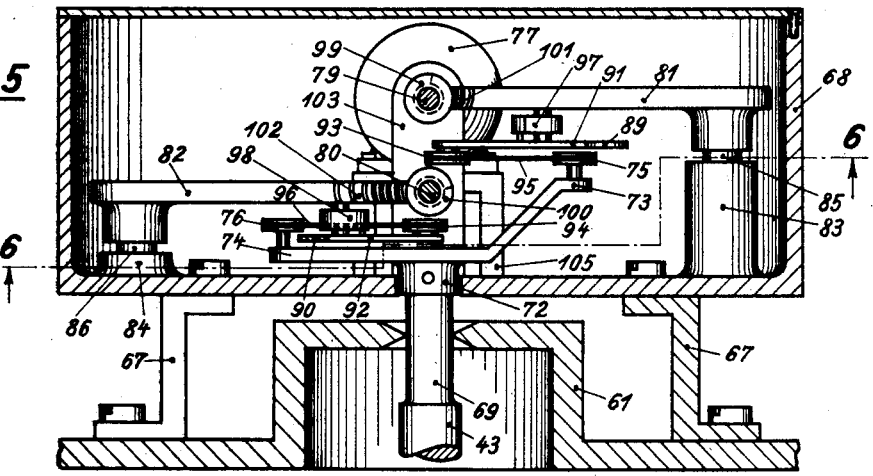
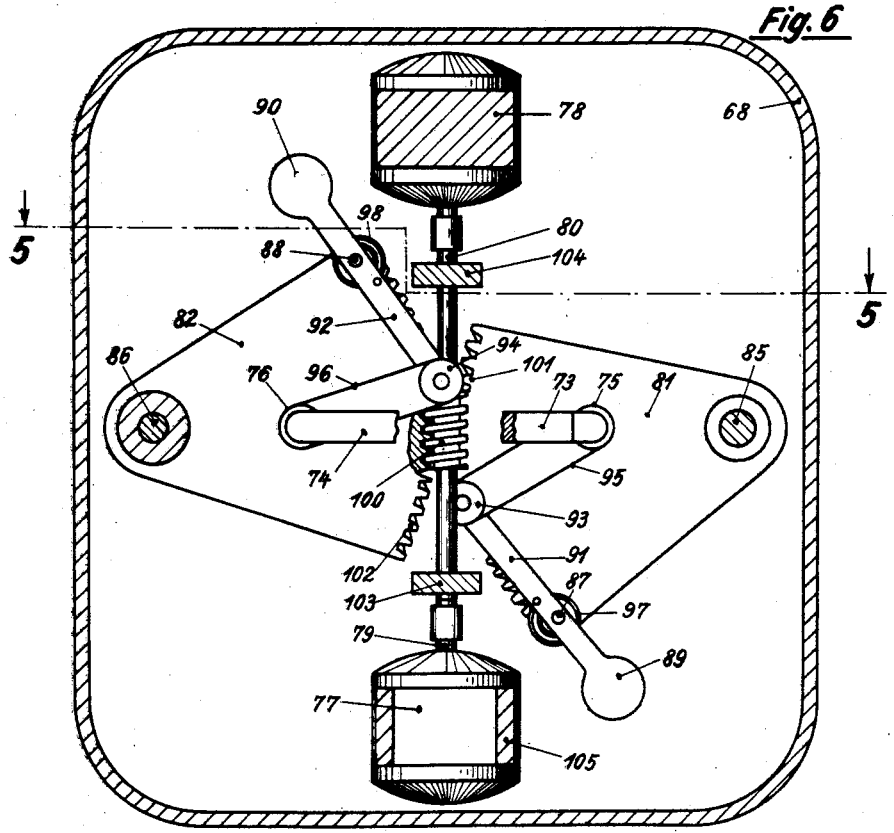
INVENTOR
JOHANN MARIA BOYKOW
By
ATTORNEYS.

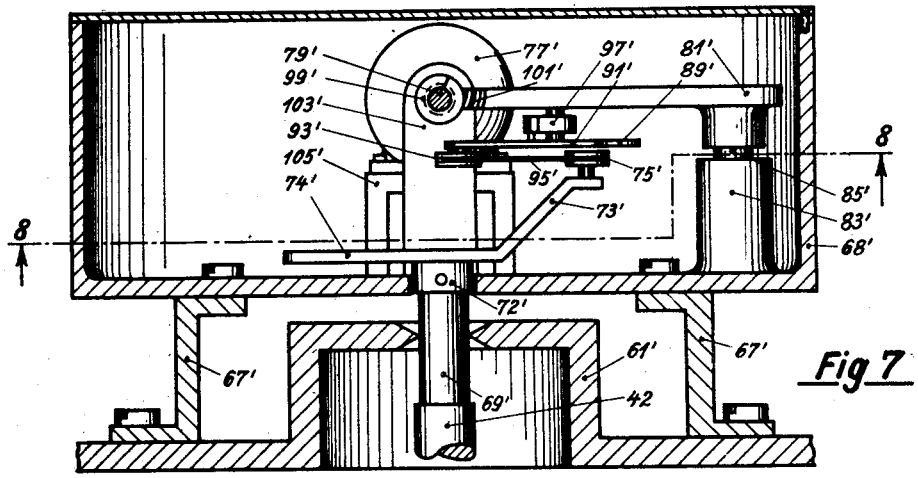
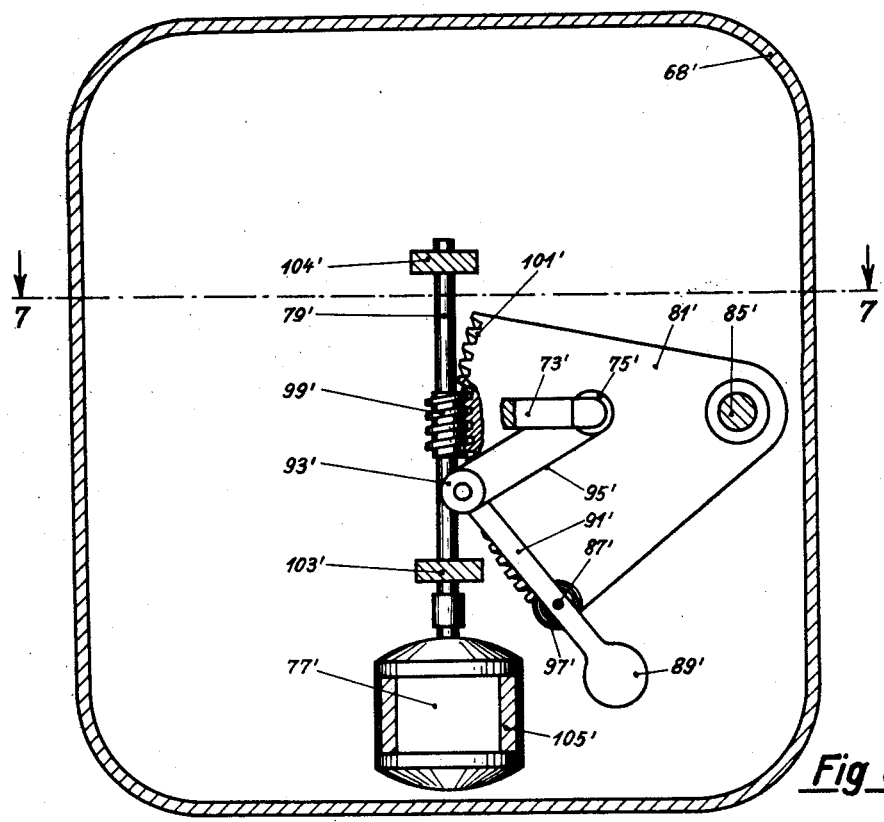

Feb. 22, 1938.  J. M. BOYKOW  2,109,283
INSTRUMENT FOR INDICATING NAVIGATIONAL FACTORS
Filed Jan. 10, 1934    17 Sheets-Sheet 6
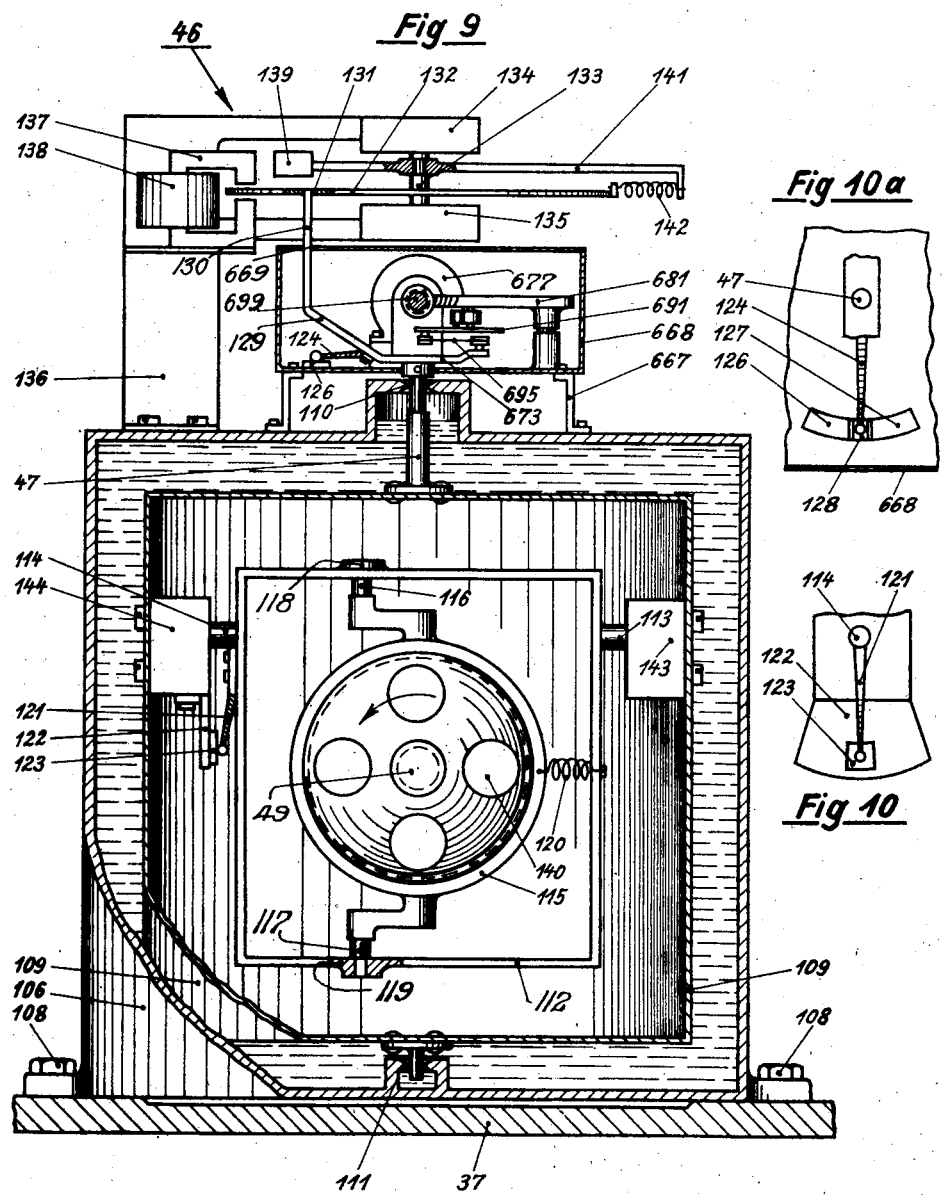
INVENTOR
JOHANN MARIA BOYKOW
BY
ATTORNEYS Feb. 22, 1938. J. M. BOYKOW 2,109,283
INSTRUMENT FOR INDICATING NAVIGATIONAL FACTORS
Filed Jan. 10, 1934 17 Sheets-Sheet 7
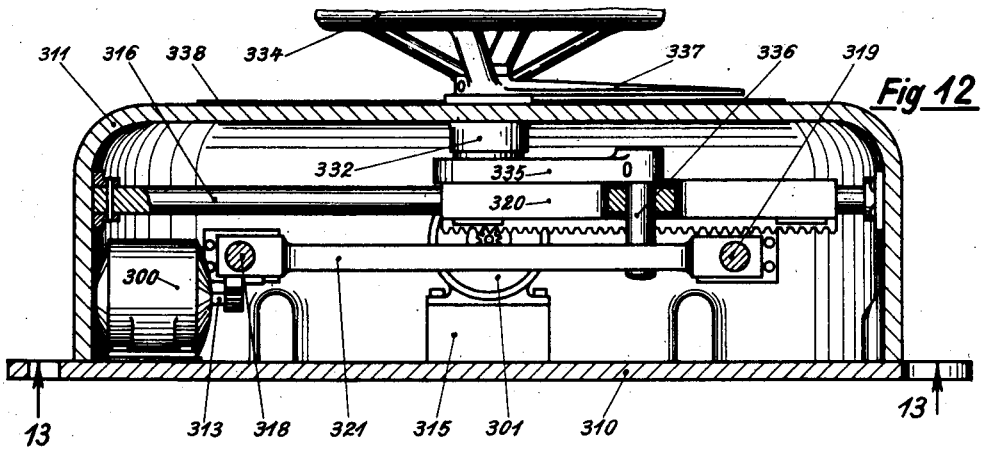
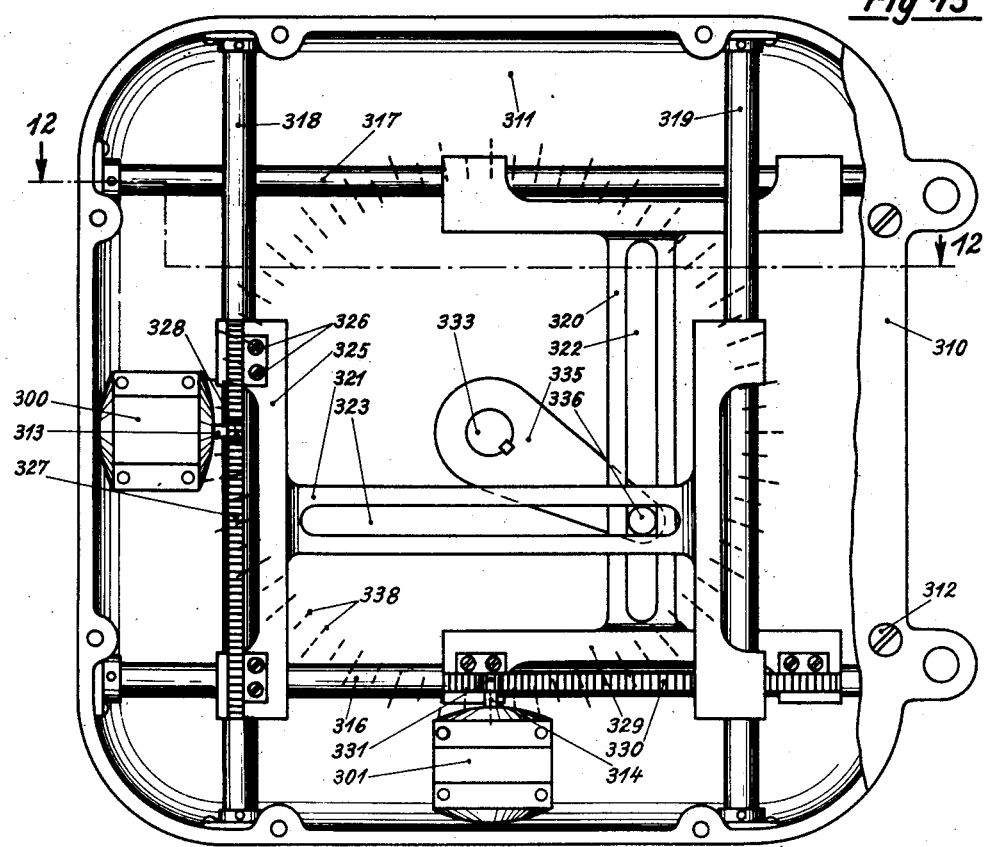
INVENTOR
JOHANN MARIA BOYKOW
BY
ATTORNEYS.

Feb. 22, 1938.   J. M. BOYKOW   2,109,283
INSTRUMENT FOR INDICATING NAVIGATIONAL FACTORS
Filed Jan. 10, 1934    17 Sheets-Sheet 8

INVENTOR
JOHANN MARIA BOYKOW
BY
ATTORNEYS.

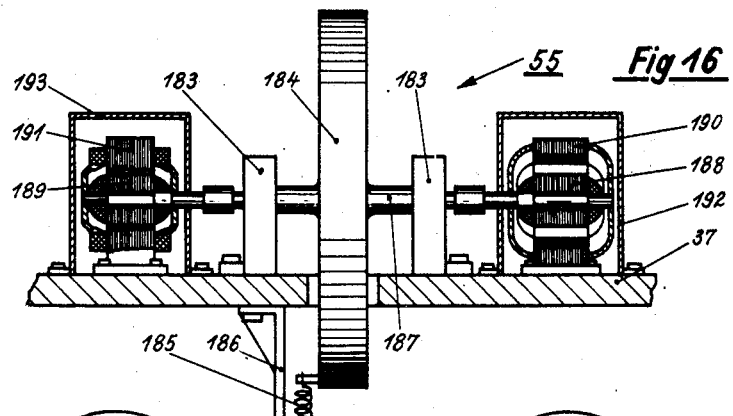
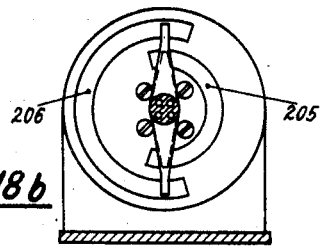
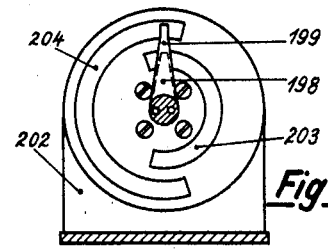
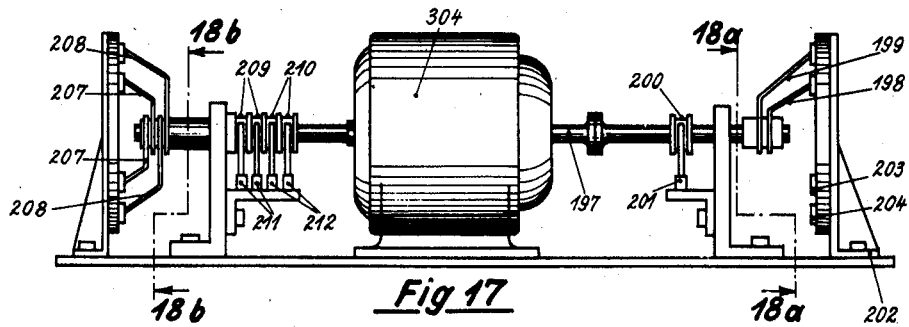
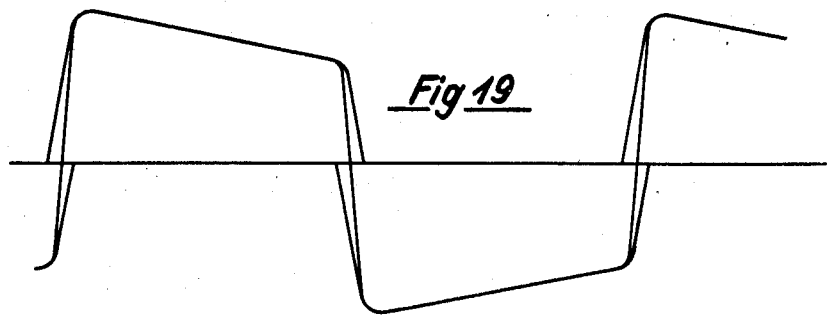

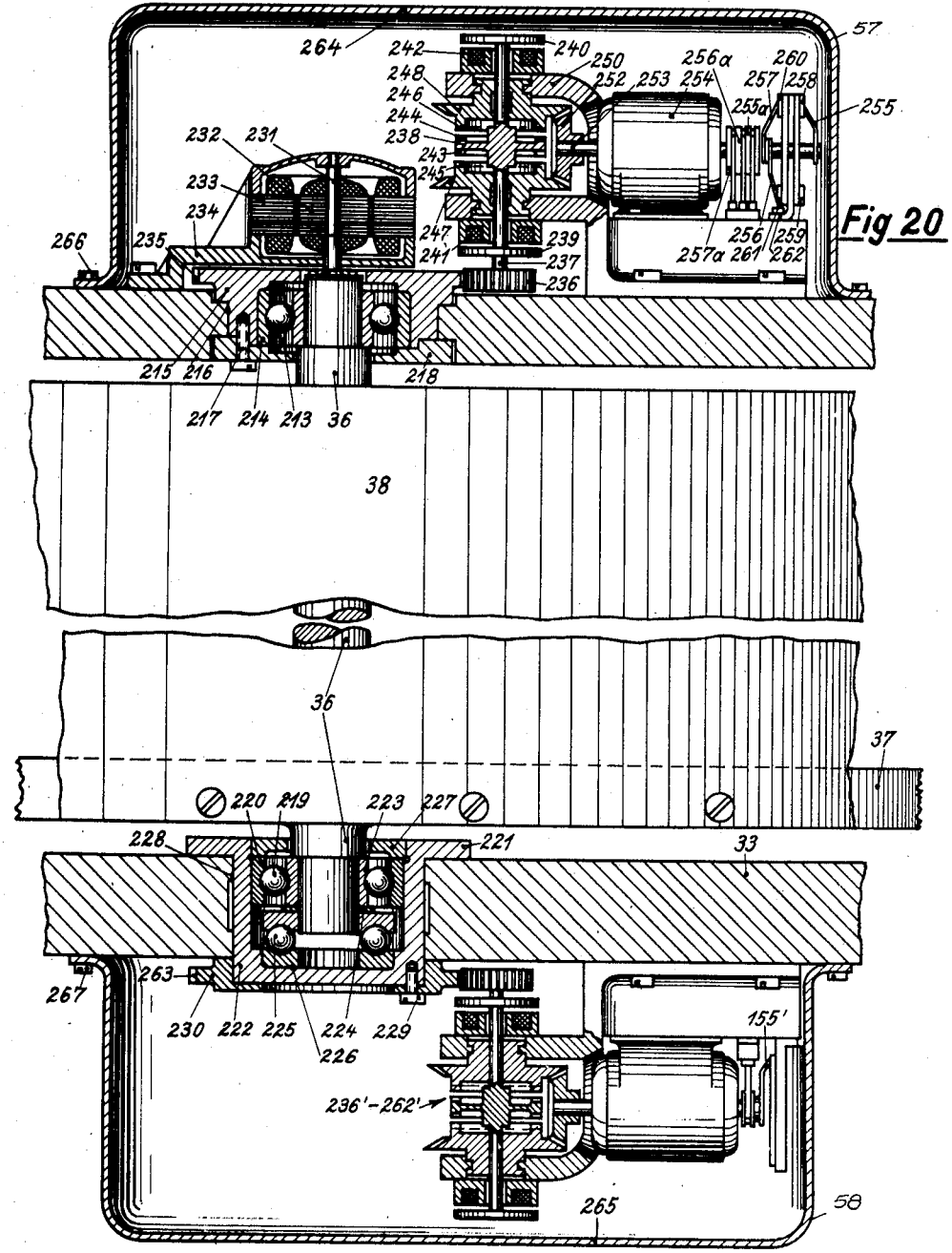

Feb. 22, 1938. J. M. BOYKOW 2,109,283
INSTRUMENT FOR INDICATING NAVIGATIONAL FACTORS
Filed Jan. 10, 1934 17 Sheets-Sheet 11
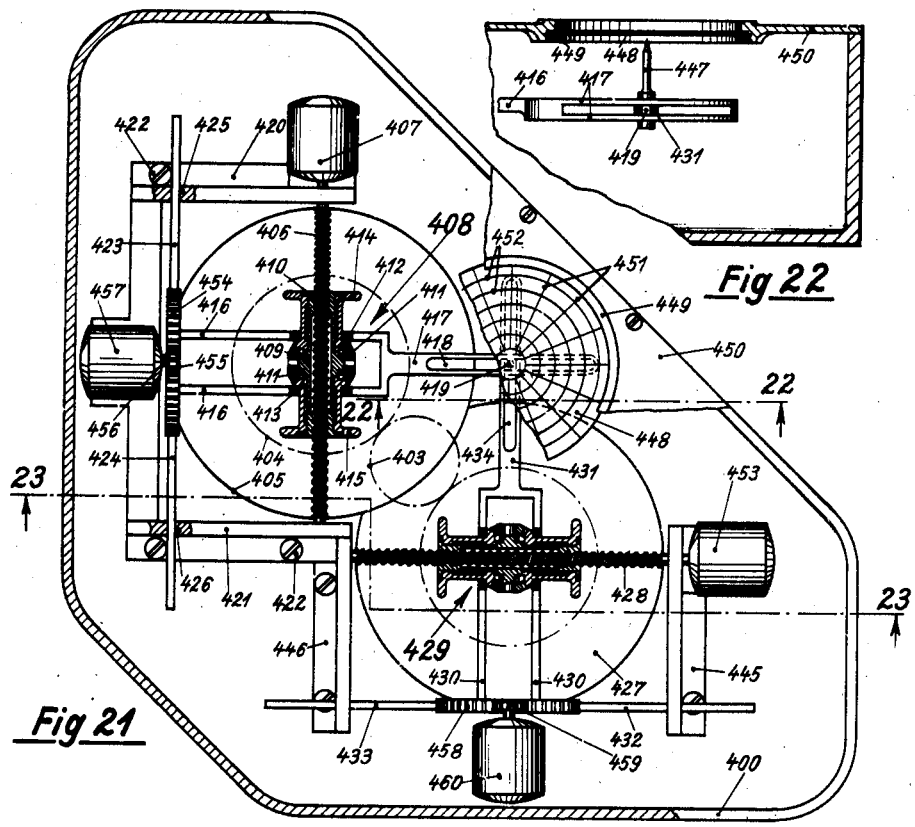
Fig 21
Fig 22
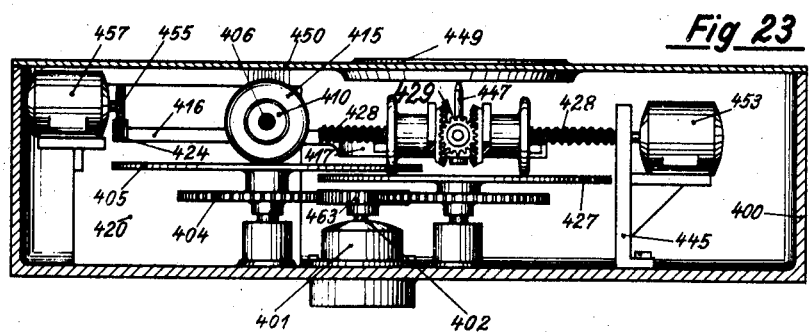
Fig 23
INVENTOR
JOHANN MARIA BOYKOW
BY
ATTORNEYS.

Feb. 22, 1938.  J. M. BOYKOW  2,109,283
INSTRUMENT FOR INDICATING NAVIGATIONAL FACTORS
Filed Jan. 10, 1934   17 Sheets-Sheet 12

INVENTOR
JOHANN MARIA BOYKOW
BY
ATTORNEYS.

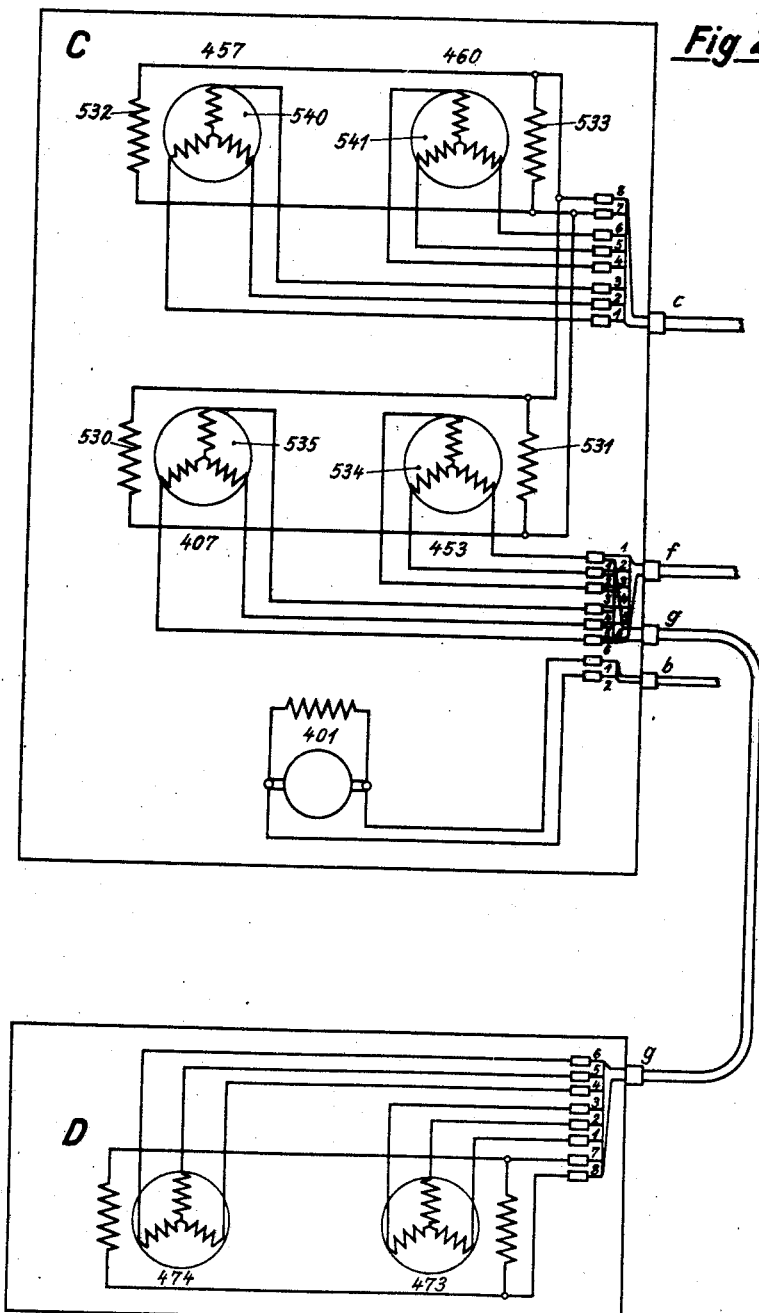

Feb. 22, 1938.  J. M. BOYKOW  2,109,283
INSTRUMENT FOR INDICATING NAVIGATIONAL FACTORS
Filed Jan. 10, 1934  17 Sheets-Sheet 16
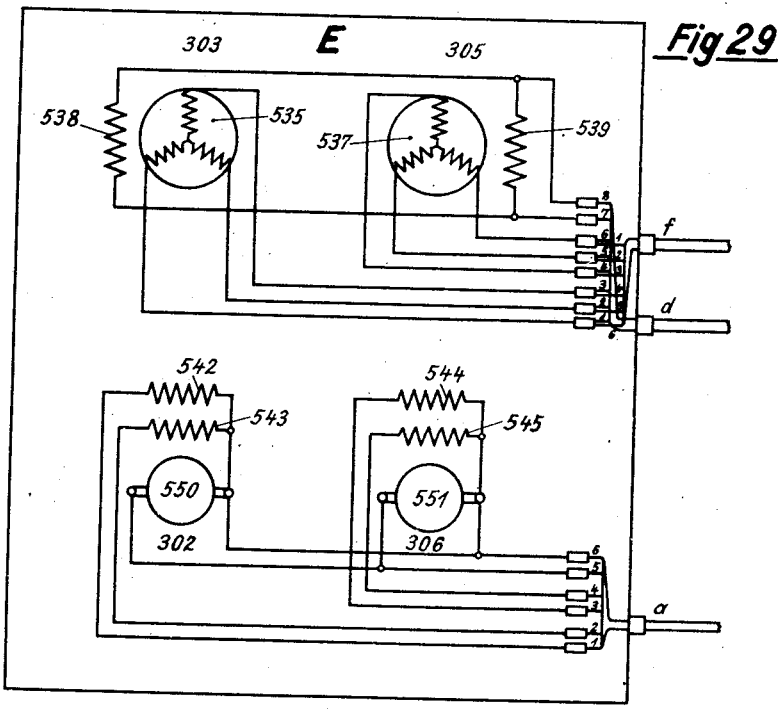
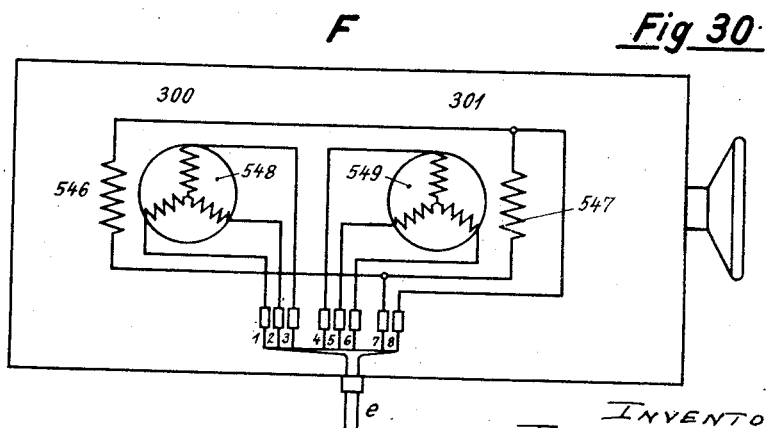

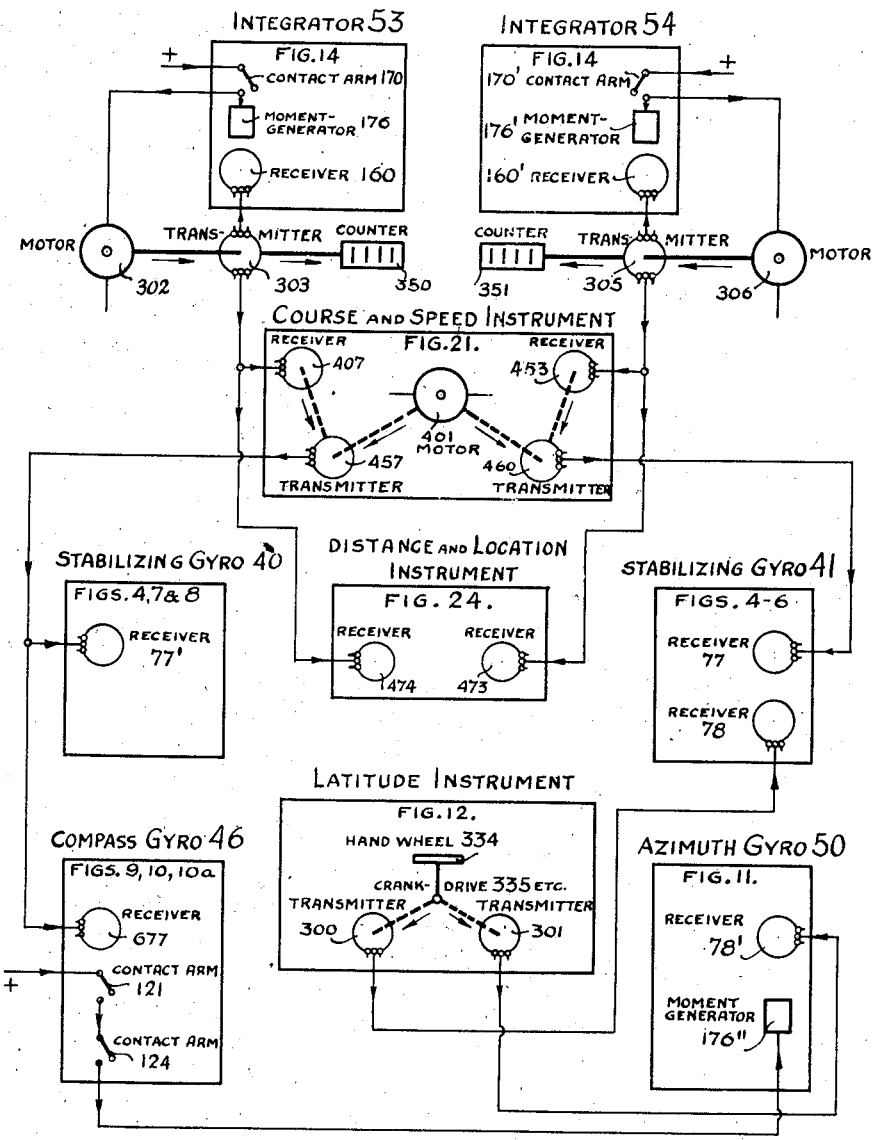

Patented Feb. 22, 1938

2,109,283

UNITED STATES PATENT OFFICE 2,109,283

INSTRUMENT FOR INDICATING NAVIGATIONAL FACTORS

Johann Maria Boykow, Berlin-Lichterfelde-West, Germany, assignor, by mesne assignments, to Deutsche Luftfahrt- und Handels-Aktien-Gesellschaft, Berlin, Germany, a corporation of Germany Application January 10, 1934, Serial No. 705,997

21 Claims. (Cl. 73—151)

This invention relates to a device for measuring distances.

For measuring, with respect to length and direction, distances covered by all classes of craft, such as land, air, and water craft, it has heretofore been necessary to establish some relation to the travelling path or to determine the momentary position by sight or observation in order to compute the distance covered, with respect to length and course, from the difference of the positional data.

The object of the present invention is to provide a device, or system, to determine with respect to length and direction, the distance traversed by a craft at any given moment, and that without requiring either a correlation between craft and travelling path or the determining of the momentary position by the observation of objects outside the craft in question.

The object of the invention is thus to provide a device, or system, for determining the distance covered by a double integration of the acceleration to which the craft is subjected.

The object of the invention is, furthermore, to provide a device, or system, for determining the distance traversed in a definite direction by double integration of the acceleration to which the craft is submitted in this direction.

The object of the invention is, moreover, to provide a device, or system, for determining, with respect to length and direction, the distance covered by any craft from the starting point, and thus its position at any given moment, both by double integration of the acceleration to which the craft is subjected from two different directions, these directions suitably being at right angles to each other, and by geometrical addition of the two distances covered in the said directions.

The present invention, furthermore, relates to a body oscillating in the craft, the deflections of which are proportional to the acceleration acting upon it, in conjunction with an electric switch which supplies current to the exciting circuit of an electric motor in proportion to the magnitude and duration of the acceleration acting upon the oscillating body, to the effect that the rotor of the electric motor, freed of all possible forces other than those acting upon the oscillating body, describes revolutions the number of which, in each case, is proportional to the distance traversed by the craft. In the following, an instrument arranged in the said manner will be called "integrator".

Another object of the present invention is to provide means having the tendency to maintain the oscillating body permanently in a definite direction to an earth direction, say the north-south direction, resulting in the oscillating body responding to an acceleration of an east-to-west tendency.

A further object of the invention is the application of two oscillating sets or "integrators", oscillating in a horizontal plane and so arranged that the oscillating masses, in their center positions, are situated on radii at right angles to each other and passing through the respective centers of oscillation.

The present invention, furthermore, consists in means for neutralizing the effect of bearing friction.

An additional object of the invention consists in the application of stabilizing gyros so as to maintain the horizontal position of the base of the swinging bodies.

A further object of the invention consists in the application of a swinging body in the form of a casing, with a field coil for a rotor rotating in the said casing and provided with an armature winding so that the torque of the stator results in a counter-torque of the rotor.

A further object of the invention consists in means to compensate for the influences exerted by both the true and the apparent rotation of the earth upon the oscillating bodies.

Another object of the invention consists in the arrangement of two "integrators" with horizontal oscillating plane, the one of which responds to acceleration in east-west direction, the other to acceleration in north-south direction, on a gimbal-suspended platform stabilized by two gyros one of which is allotted to each "integrator", and provided with a north-south gyro as well as an azimuth gyro.

Another object of the invention consists in shaking devices for neutralizing the effect of bearing friction on the platform or on the apparatus mounted on the platform.

Another object of the invention consists in means to indicate the number of revolutions of the rotor of an integrator and to determine therefrom the distance covered.

Another object of the invention consists in means for indicating, with the aid of the "integrator" movements, the travelling speed and course, at any given moment.

Another object of the invention consists in means for automatically adding up geometrically the distances determined from the values obtained from the two integrators.

Another object of the invention consists in a device for representing a distance to be covered on two charts the one of which contains, on transparent material, the distances from one place to another according to the geographical longitude, the other the said distances according to the geographical latitude, and, furthermore, in means for moving the crosswise overlapping charts, each according to the revolutions of one of the two integrators, in such a manner that those points of the two charts, which are situated on the intersecting point simultaneously, indicate the position of the craft at any given moment.

Another object of the invention consists in means by which, if a chart arrangement of the said kind is used and which would correspond to a chart network in Mercator's projection, a correction is effected and the true geographical longitude of the momentary position of the craft obtained.

Further particulars and objects of the invention may be derived from the following description and the attached drawings. Although in the accompanying drawings I show essentially only one way of putting the invention into effect, variations may be made without departing from the spirit of the invention as defined in the claims.

I would explain that by "transmitters" and "receivers", as will be repeatedly mentioned in the following, similar apparatus are to be understood as are frequently employed on board ship in the form of engine room telegraphs. Each of these well known "transmitters" and "receivers" consists of an armature with three-phase winding and a single-phase field winding fed with alternating current. The three armature phases of a transmitter are electrically connected with the three phases of the armature of the associate receiver, so that the rotation of the transmitter armature causes the armature of the receiver to rotate through a similar angle. The three-phase winding may, however, also be arranged on the stator and the single-phase winding on the rotor of the transmitter and receiver.

In the accompanying drawings:

Fig. 1 is a schematic drawing showing the cooperating groups of apparatus and their main connections.

Fig. 2 is a diagrammatic top view of the apparatus receiving the acceleration, according to the invention, with two integrators, two stabilizing gyros and two direction gyros and shaking devices, the protective cover being partly removed.

Fig. 3 is a diagrammatic side view of the apparatus, with the individual apparatus covered by the protective hood.

Fig. 4 is a side view of one of the stabilizing gyros, with part of the case and gyro float shown in section.

Fig. 5 is a vertical section of the upper part of Fig. 4, on a larger scale, along line 5—5 of Fig. 6, looking in the direction of the arrow.

Fig. 6 is a section along line 6—6 of Fig. 5, looking in the direction of the arrow.

Figs. 7 and 8 are sections, similar to those of Figs. 5 and 6, of the corresponding parts on the other stabilizing gyro.

Fig. 9 is a vertical section through the compass-gyro arrangement, and

Figs. 10 and 10a show different views of parts thereof.

Fig. 11 shows a diagrammatic side view of the azimuth gyro.

Fig. 12 is a transmitter rotating device for correcting the true earth rotation, in section along line 12—12 of Fig. 13.

Fig. 13 shows the same device in section along line 13—13 of Fig. 12.

Fig. 16 is a side view, partly sectional, of a shaking device.

Fig. 17 shows a side view of parts for controlling the shaking devices.

Fig. 18a is a section along line 18a—18a and Fig. 18b a section along line 18b—18b of Fig. 17.

Fig. 19 is a diagrammatic representation pertaining to the shaking device.

Fig. 20 shows a section of another type of shaking device.

Fig. 21 shows a top view of a device for representing travelling course and speed, at a given moment, partly in section and partly with the cover plate removed.

Fig. 22 shows a section along line 22—22 of Fig. 21, and

Fig. 23, a section along line 23—23 of Fig. 21.

Figure 24:
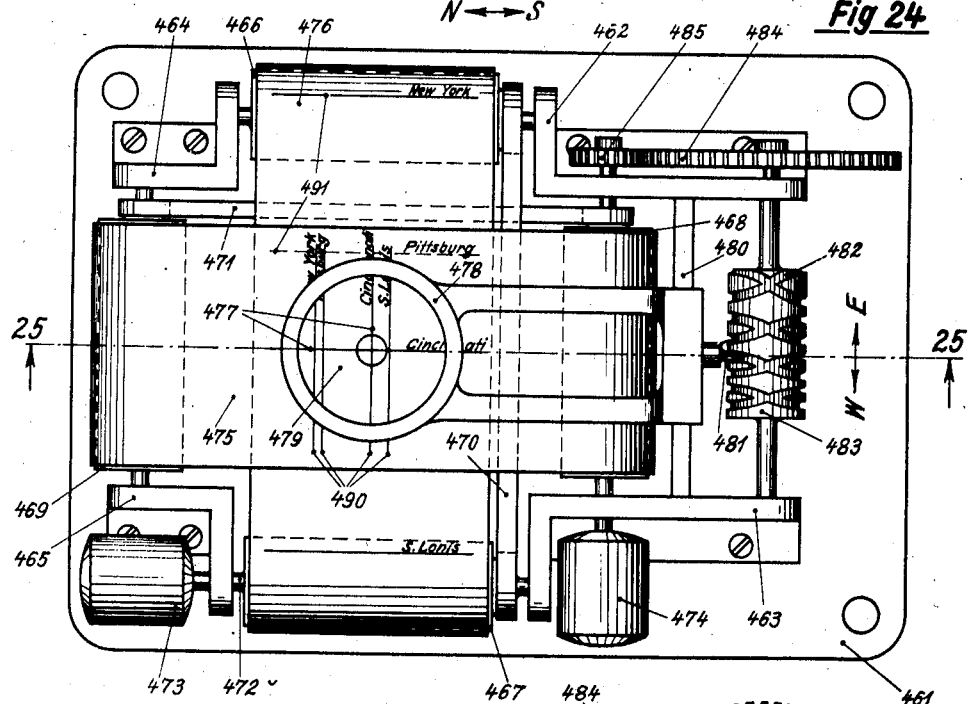

Fig. 24 is a top view of an apparatus used for automatically adding up geometrically the distances covered and for determining the position at any given moment, according to the invention.

Figure 25:
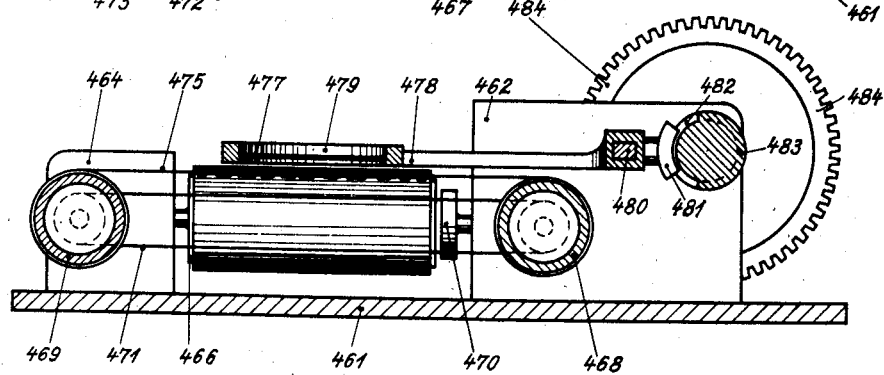

Fig. 25 is a section along line 25—25 of Fig. 24.

Figure 26:
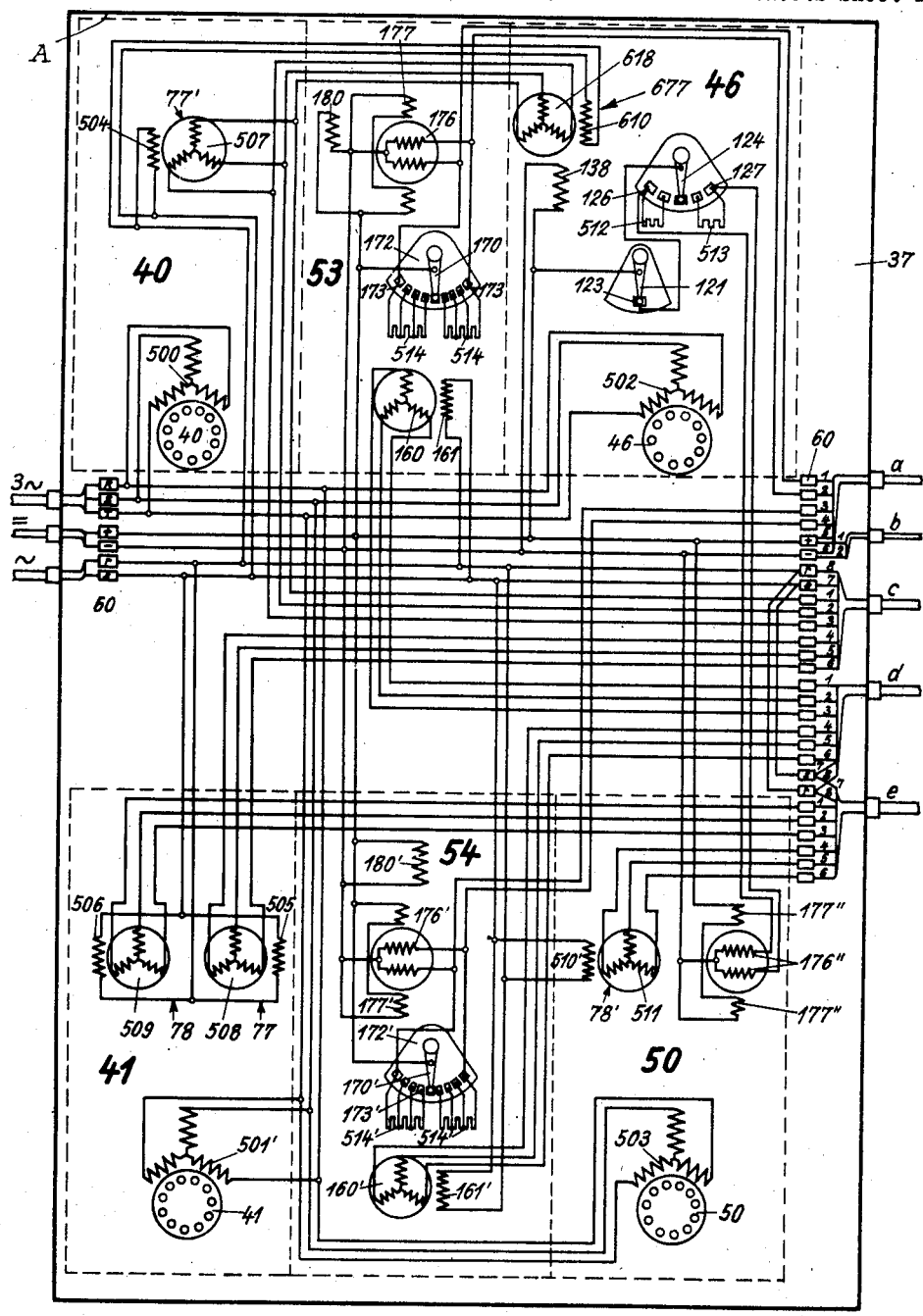
Figure 27:
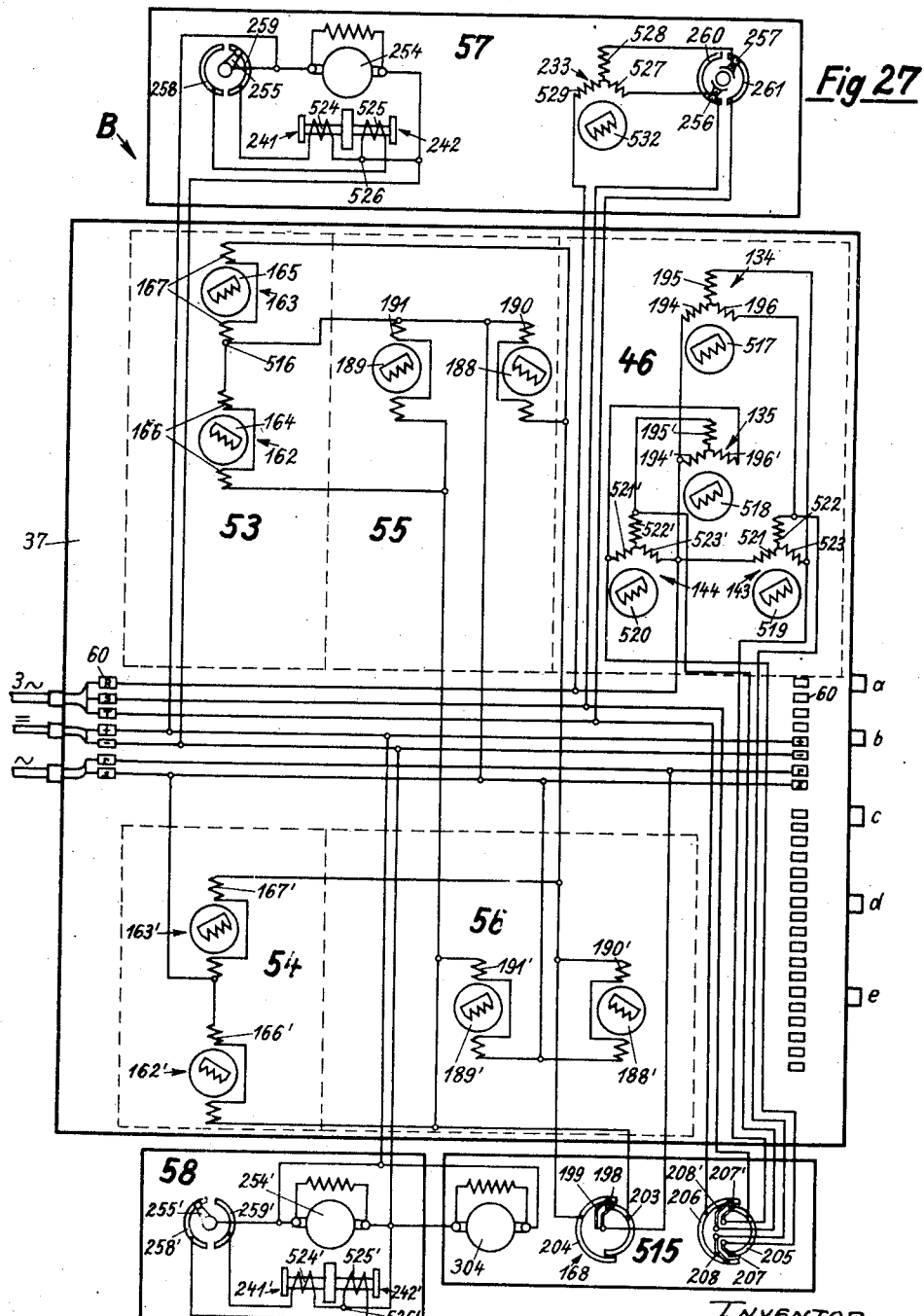

Fig. 26 is a circuit diagram of group A of Fig. 1,

Fig. 27 is a circuit diagram of group B,

Fig. 28, a circuit diagram of groups C and D,

Fig. 29, a circuit diagram of group E,

Fig. 30, a circuit diagram of group F, and

Fig. 31, a diagram showing the interconnection of the individual instruments.

The whole apparatus, as covered by the invention, consists of a plurality of individual instruments and auxiliary apparatus, which, for the sake of clearness will, in the following, be treated in individual groups. These groups of apparatus can all be arranged on a common base or partly mounted separately at suitable points of the craft, in which case they need only be interconnected by electric wires. Obviously, not all instruments need be present at the same time.

In Fig. 1:—

Group A comprises the "integrators" with their auxiliary instruments and apparatus required for stabilizing them and setting them to the correct position.

Group B comprises the shaking devices for preventing the occurrence of faults due to bearing friction in the instruments and apparatus of group A.

Group C comprises the instrument which indicates the ground course and speed.

Group D comprises the instrument which indicates the position and effects the automatic geometrical addition of the distances traversed.

Group E comprises two transmitters with constant drive by two motors.

Group F comprises manually operated transmitters for correcting the true earth rotation.

3 ∼ denotes a three-phase current lead which thus contains three wires, = denotes a direct current line which consists of two conductors, and ∼ a single-phase current line likewise consisting of two conductors. The current sources not represented here may be of any kind as long as they supply current of the character and strength required. Letters $a$ to $g$ signify groups of conductors for connecting groups A to F. The number of conductors of each group may be derived from Figs. 26 to 30.

A description of the individual instruments and apparatus will be given first, to be followed by comments on their correlation and cooperation, as illustrated in Figs. 1 and 26–31.

In the example described, the integrators are arranged on a platform suspended on gimbals, maintained in north-south direction by a compass gyro and kept in horizontal position by stabilizing gyros. The components of groups A and B are connected with the platform or with its supporting device.

In Figs. 2 and 3 30 is a base-plate with two supports 31 in which the apparatus is pivoted with two gimbal rings 32 and 33, 34 being the axis of rotation of ring 32 and 35 that of ring 33. 36 is an axis arranged at right angles to axes 34 and 35, which supports platform 37 on which the instruments are mounted and is one piece with same. A protective cover 38 which covers the instruments arranged on platform 37, is fixed to the platform in a suitable manner, e. g. by screws 39. To stabilize the platform, the gyros 40 and 41 are provided which are represented as asynchronous motors (see Fig. 26); the said gyros are capable of precessing on shafts 42 and 43 respectively. Their impulse shafts 44 and 45 respectively are arranged at right angles to each other. Shafts 44 and 45 are preferably arranged in parallel or at right angles to the meridian. 46 is a compass gyro with three degrees of freedom, determined by the axis of precession 47, Cardan shaft 48 and impulse shaft 49, which is parallel to the meridian. To illustrate an example, impulse shaft 44 of the one stabilizing gyro 40 is preferably arranged parallel to the impulse shaft 49 of the compass gyro; this, however, is not absolutely necessary.

50 is an azimuth gyro with horizontal axis of precession 51; its impulse axis 52 may have any position, i. e. either also horizontal, as shown in the drawings, or vertical. The acceleration integrators 53 and 54 for measuring distances are associated with the stabilizing gyros 40 and 41 in such a manner that the impulse shaft of either stabilizing gyro is parallel to the direction of acceleration forces to which responds the integrator associated with same or the oscillating body contained in same and described in the course of the specification. Associated with each other in the manner described above are the stabilizing gyro 40 and the integrator 53 on the one hand and stabilizing gyro 41 and integrator 54 on the other.

The relative position of the integrators is also determined by the fact that the lines tangent to the circles described by the oscillating bodies through the points of intersection of the oscillation circles with the radii corresponding to the neutral positions of the oscillating bodies are at right angles to each other, no matter whether oscillating bodies are employed having a vertical axis of rotation or such having a horizontal axis of oscillation. If, as in the example described, the axes of oscillation are maintained in a vertical position, not only will the said tangents be at right angles to each other but even the radii corresponding to the neutral positions of the oscillating bodies.

Means are provided for eliminating the effects of bearing friction. For this purpose there are two shaking devices 55 and 56 with a relative displacement of their axes by 90 degrees. The shaking devices, which in the course of the description will be referred to in detail, are connected with the platform itself and mounted on same with the result that they act upon the platform directly; the shaft of the shaking device 55 is parallel to the impulse shaft 44 of the stabilizing gyro 40 and the shaft of the shaking device 56 is parallel to the impulse shaft 45 of the stabilizing gyro 41. A third shaking device 57, 58 (see Fig. 20) is provided and described below; the said device consists of two parts one of which is arranged on the upper part of shaft 36 and the other on the lower part. These parts are covered by the protective hoods 264 and 265 respectively which are fastened to Cardan ring 33 in a suitable manner, as, for example, by screws 266 and 267 respectively. Instead of providing shaking devices such as 55 and 56 on the platform, I may mount on the shafts 34 and 35, shaking devices of the type shown in connection with shaft 36. On shaft 34 means are also arranged, as, for example, slip rings 60 of which but a few are represented schematically and whose function it is to tap current from the various electric conductors indicated in Figs. 1 and 26–31. Corresponding slip ring leads (not contained in the drawings) are provided on the other shaft also for the purpose of passing the current from ring 32 via ring 33 to platform 37. As these devices are known and not covered by the claims, it is unnecessary to include them in the drawings since this would not add to the clearness of the diagram.

The stabilizing gyros 40 and 41 are equal as far as their main parts are concerned. The description will now proceed in accordance with Fig. 4 for the east-west gyro 41. The gyro is arranged in the form of a so-called float gyro used for the purpose of diminishing the friction, there is no reason, however, not to apply successfully a gyro of some other well known type. An external case 61 is rigidly fixed to platform 37 and filled with a liquid 62. In the said liquid the float 63 floats with a vertical axis 43 which simultaneously is the precession axis of the gyro contained in the float. 64 is the gyro body with the impulse shaft 45. The gyro box 65 is rigidly connected with float 63 by means of bracket 66. On float box 61 a junction box 68 is arranged into which the upper end 69 of the precession axis 43 protrudes and which is rigidly connected with the said float box by partitions or bracket 67. The precession axis is pivoted at its upper and its lower end on bearings 70 and 71 respectively.

Means are provided for the purpose of compensating the influence of the rotation of the earth in the stabilizing gyros 40 and 41, special means being available at the east-west gyro to compensate for both the true and the apparent rotation of the earth; the north-south gyro 40 is only provided with means for compensating the apparent rotation of the earth. The said compensating means are housed in the junction box 68; they are shown in large-scale drawings in Figs. 5 and 6 referring to the above east-west gyro 41, and in Figs. 7 and 8 pertaining to the north-south gyro.

As already stated above, the extension 69 of precession axis 43 protrudes into junction box 68 and rotates freely (Figs. 5 and 6). The extension 69 supports a rigidly connected yoke-shaped piece 72 on its end, the arms 73 and 74 of which can be seen in Fig. 6 where the middle section is not shown. Each of the arms 73 and 74 has a freely rotating pulley at its end (75 and 76 respectively).

In addition, the case 68 contains two synchronous receivers 77 and 78 one arranged higher than the other, so that the receiver 77 acts upon a shaft 79, and receiver 78 on a shaft 80. Shafts 79 and 80 are arranged between the dogs 103 and 104 fixed on the case 68, and the receiver 77 is fitted to the dog 105. The axes of shafts 79 and 80 are at right angles to the zero position of the yoke-shaped piece 72 which is determined by the direction of arms 73 and 74 when the gyro 41 is not precessing. Moreover, the two sectors 81 and 82, which are capable of oscillating about shafts 85 and 86, are pivoted to the case 68 at 83 and 84 respectively. The sectors carry, on shaft 87 and 88, the rotatable levers 91 and 92 which are balanced by weights 89 and 90. The ends of the levers carry pulleys 93 and 94 which are connected by driving threads 95 and 96 with the pulleys 75 and 76 respectively. The spiral springs 97 and 98 arranged on the shafts 87 and 88 as well as on levers 91 and 92, serve to maintain the thread drive under a definite tension. Either of the received shafts 79 and 80 carries a worm (99 and 100 respectively) which meshes with a corresponding cogging (101 and 102 respectively) of the segments 81 and 82. The receiver 77 is adjusted by a transmitter 460 (see Figs. 21, 26, 28) in proportion to the ground speed component, in the manner described later, the said component being parallel to the actuating spindle 45 of the gyro 41. The said receiver serves to compensate for the influence produced by the apparent rotation of the earth due to the ground speed.

A transmitter 300 (see Figs. 12, 13, 26, 30) acts upon the receiver 78. The said receiver serves for compensating the influence produced by the true rotation of the earth upon the east-west gyro 41. Due to its being readjusted by hand according to requirements, the transmitter 300 acts upon the said receiver in proportion to the cosine of the geographical latitude.

As already mentioned above, the north-south stabilizing gyro 40, contrary to the east-west gyro, only required a device for compensating the apparent rotation of the earth. The parts serving this purpose are the same as those used for gyro 41 and are represented in Figs. 7 and 8 and have the same reference figures to which a ' is added as in the case of the corresponding parts illustrated in Figs. 5 and 6. It should be noted that the free arm 74' of the yoke-shaped piece 72' may serve to balance the mass of arm 73'. The receiver 77' is set by the transmitter 457 (see Figs. 21, 26, 28) in proportion to the speed component which lies parallel to the impulse shaft 44 of the gyro 40.

The compass gyro 46 with north-south impulse shaft 49 is shown in Fig. 9. This gyro is also constructed in the form of a float gyro in such a manner that a case 106 filled with a liquid and provided with a float is available, the case being fixed on platform 37 by suitable means, such as screws 108. This gyro also may be constructed in some other suitable way considering that the float device merely serves the purpose of reducing the friction to a minimum.

A float 109 is pivoted in an upper bearing 110 and a lower bearing 111 in case 106; it rotates on the vertical shaft 47 and, within its interior, supports a frame 112 with a horizontally rotating shaft which lies above the impulse shaft 49 and is formed by the journals 113 and 114 with the result that the frame may oscillate in float 109. Shaft 47 is rigidly connected with float 109 and the shaft connecting pieces 113 and 114 are likewise rigidly fixed on frame 112. The said pieces 113 and 114 are connected with the shaking devices 143 and 144 which will be described later on. The gyro box 115 having a vertical shaft 116 and 117 is laterally displaced in relation to shaft 47 by a predetermined amount and pivoted in frame 112 at points 118 and 119, in such a manner that the centre of gravity of the whole system lies in a plane containing shaft 47, when the gyro is in its neutral position. The oscillating movements which the gyro box 115 can describe on axis 116 and 117, act upon an elastic spring 120 fastened to the gyro housing 115 and the frame 112. By this kind of bearing of the gyro box it is intended to cause the gyro when acted upon by horizontal acceleration, to precess, not in a horizontal plane, but in a plane having a definite inclination toward the horizon.

Frame 112 carries on its shaft 114 a contact arm 121 rotating with same; the said arm is capable of sliding over a contact segment 122 fixed to the float body 109. The current transmitting contact 123 (see Fig. 10) only carries current in the neutral position. Contact-making between 121 and 123 is effected in conjunction with two further contact making elements for transmitting the impulses to the azimuth gyro 50; the said elements will be referred to in detail later.

The vertical shaft 47 of float 109 is extended upwards and carries one of the abovementioned additional contact making elements, viz. a contact arm 124 capable of sliding over the contacts 126 and 127 which are fixed on the case (see Fig. 10a); the said contacts are provided on either side of the neutral position of contact arm 124, the current supply being interrupted by an insulating piece 128 when the contact arm is in its neutral position. The two contact devices 121 to 123 as well as 126 to 128 are connected in series (see Fig. 26), current thus flowing only when the contact arm 121 is in the zero position, contact arm 124, however, outside the zero point.

As shown in the drawings, contact arm 124 is not directly connected to shaft 47 but arranged on a yoke-shaped piece 673 which, in turn, is fixed on shaft 47. The yoke-shaped piece 673 is part of a device intended to compensate the apparent earth rotation, as described above and illustrated in Figs. 7 and 8. There is no reason, therefore, to give a description of the individual parts again which cooperate here with the receiver 677 in place of the receiver 77' (Figs. 7 and 8). The said device is housed in the case 668 supported by pillars 667 on case 106. At the bottom of case 668 are arranged the contacts 126, 127 and the insulating piece 128, and in the cover of the case an opening 669, preferably of circular form, is provided for a purpose to be referred to later on. The receiver 677 is controlled by the same transmitter 457 as is also employed to actuate the receiver 77'.

Means are provided to brake the rotation of the float 109 on shaft 47. For this purpose a yoke-shaped piece 673 has an extension 129 with an arm 130 pointing upwards. The said arm projects through the said opening 669 in case 668 and with its end into a hole 131 of a copper disc 132 which has a vertical rotatable shaft 133 connected to it. Said shaft is pivoted, as described below, in the shaking devices 134 and 135 which are attached to the support 136 connected with the case 106. The copper disc 132 is part of an eddy-current brake, the brake magnet 137 of which as well as winding 138 are also supported by the bracket 136. A horizontally swinging body 139 is arranged coaxially with the copper disc 132, the mass of which is on that side of shaft 116, 117 which is opposed to the side on which the mass of the gyro body 140 with gyro box 115 is situated. The horizontally swinging body 139 is provided with an arm arranged on the opposite side, by which it is flexibly coupled over spring 142 with copper disc 132. The said spring should have a small initial tension. The body 139 can be pivoted so as to rotate freely on shaft 133 of copper disc 132.

Fig. 11 shows the azimuth gyro 50 with its precession axis 51 and impulse shaft 52. The azimuth gyro, in its case 145, is mounted so as to rotate in a frame connected with platform 37, say by screws 168, and can carry, in a case 146 arranged on frame 169, a device to balance the influence of the true rotation of the earth, similar to that in the case 68 of the stabilizing gyro 41 (Figs. 5 and 6). The azimuth gyro 50, however, has no device to balance the apparent rotation of the earth. The receiver 78' of the azimuth gyro (see Fig. 26) which corresponds to the receiver 78 of the stabilizing gyro 41 in Fig. 6 is set by a transmitter 301 which is turned by hand simultaneously with transmitter 300. The adjustment of receiver 78', effected by transmitter 301, is not proportional to the cosine but to the sine of the geographical latitude. The device employed to bring about this proportionality will be described later.

In another case 147 attached to support 169 a moment generator is provided which is constructed on the principle of a well-known Deprez instrument and consists of a moving coil which rotates in a field produced by direct current. A moment generator of this kind will be described later together with the integrator 53.

The device for turning the above mentioned transmitters 300 and 301 is illustrated in Figs. 12 and 13. A case is constructed of a base-plate 310 and a cover 311 of similar shape. The base-plate 310 and cover 311 are screwed together, say, by screws 312 inserted from below. The two transmitters 300 and 301 are mounted on base-plate 310 in such a manner that their armature shafts 313 and 314 respectively are at right angles to each other, shaft 314 however lying above shaft 313. For this purpose the transmitter 301 is not fixed to the base-plate 310 directly but on a mounting 315 belonging to same. Two guide bars each (316, 317 and 318, 319) are suitably arranged on the inside of the cover 311, parallel to shafts 313 and 314, in such a manner however that bars 316, 317 are situated above bars 318, 319. Each pair of bars serves to guide an H-shaped slide 320 (and 321 respectively) the stem of which has an oblong slot 322 (and 323 respectively). Slide 321 carries on the lower side of the flange 325 lying next to the transmitter 300, a rack 327 fixed to the said flange by the screws 326. Arranged on shaft 313 of the transmitter 300, a pinion 328 meshes with the said rack. In the same manner slide 320 is provided with a rack 330 (on flange 329) with which a pinion 331 meshes, which is rigidly mounted on shaft 314 of transmitter 301. At the top of cover 311 a bearing 332 is provided the shaft of which running vertically from top to bottom, intersects the axes of the shafts 313 and 314. In bearing 332 a pivot 333 is arranged which carries a hand wheel 334 at the top and a crank arm 335 at the bottom. At the other end of the said crank arm is mounted a pin 336 the diameter of which equals the width of slots 322 and 323, and which projects into the two slots. A pointer 337 is connected with the hand wheel 334, which can be caused to move over a graduation 338 which is fastened to the cover 311 or engraved, and that in such a manner that the zero line is parallel to the shaft of transmitter 300. If the hand wheel 334 is turned through a desired angle adjustable by means of pointer 337 and graduation 338 the rack 327 is displaced in proportion to the cosine and the rack 330 in proportion to the sine of the angle, and the pinions 328 and 331 cause the transmitters 300 and 301 respectively to rotate correspondingly.

In the following a description is given of the so-called "integrators" 53 and 54. Both integrators which, in point of construction, fully coincide with each other, are constructed as a horizontally oscillating mass in such a manner that each integrator has an oscillatable weight 148 (and 149 respectively) as well as a vertical axis of oscillation 148a (and 149a respectively) (see Fig. 2). One stabilizing gyro is assigned to each integrator. The assigning of one of the integrators to one of the stabilizing gyros is determined by the fact that in the rest or neutral position the centre of gravity of the oscillating weight lies on a radius which is at right angles to the impulse shaft of the associate stabilizing gyro. Thus, integrator 53 is associated with gyro 40 and integrator 54 with gyro 41 considering that the connecting line between 148 and 148a is at right angles to the gyro shaft 44. The integrators are arranged on the same platform (37) as the gyros are. A detailed description will be given in connection with the integrator 53.

The integrator 53 (see Fig. 14) associated with the north-south gyro 40 consists of a circular case 152 with cover plate 153, to which the oscillatable weight 148 is attached. The two parts 152 and 153 are connected with each other, say, by screws 154. The case 152 is closed so as to reduce to a minimum the air friction of parts rotating inside the case. The case is provided with a lower journal 155, rigidly connected with same, and the cover plate has an upper journal 156. The journals are mounted so as to rotate on a U-shaped support 157 fixed on platform 37 by screws 158 or the like. Inside the case an inertia mass 159 is capable of rotating freely with its shaft 150 which is arranged coaxially with the journals 155, 156. Shaft 150 carries an armature 160, and case 152 an associate field 161. Said armature and field constitute a synchronous receiver whose transmitter 303 (see Fig. 15) will be described later. On the journals 155 and 156 respectively, means are provided, on either side of the case, for compensating the effects due to bearing friction. The said means consist of the shaking devices 162 and 163 and comprise a short circuit armature 164 (and 165 respectively) mounted on shaft 155 (156 respectively) and a twin-coil alternating field 166 (167 respectively) attached to the support 157. Shaking is effected by commutating the alternating fields in cadence, the commutators themselves being displaced with respect to each other.

Commutation is effected by means of commutating devices actuated by an electric motor 304 (see Figs. 17, 27) and to be referred to later on.

Means are provided to control an electric motor 302 arranged outside the apparatus, by means of the deflections of case 152, resulting from the effect produced by the accelerations; the motor in turn, rotates a transmitter 303 (see Fig. 15) for which armature 160 and field 161 constitute the receiver. The motor 302 is provided with a well known equipment (350) for counting the revolutions for a special purpose to be dealt with later. The said means consist of a contact device at the upper end of shaft 156 with a contact arm 170 with contact pearl 171, which moves over a contact segment 172 with graduation 173 (see Fig. 26), when case 152 rotates. The said contact segment 172 is arranged on a shaft 175 of a double-coil armature 176, which, together with a two-coil field 177, forms a moment generator; the said shaft 175 is mounted on part 174 of support 157. The field 177 is rigidly mounted on support 174. On shaft 175 is, furthermore, arranged the copper disk 178 of an eddy-current brake with the magnets 179 mounted on support 174 and the coil 180. The segment 172 is also provided with a so-called zero spring 182, which acts upon an arm 181, rigidly connected to the support 157 and tends to maintain the segment 172 as well as the parts connected with same in a definite zero position. The current controlled by contact pearl 171 actuates the above mentioned external electric motor 302 as well as the moment generator 176, 177. The complete device 170-182 serves to produce a damping effect upon the current regulation of the afore-mentioned motor 302. Contact arm 170 with contact segment 172 are clearly to be seen in Fig. 26.

Figure 14:
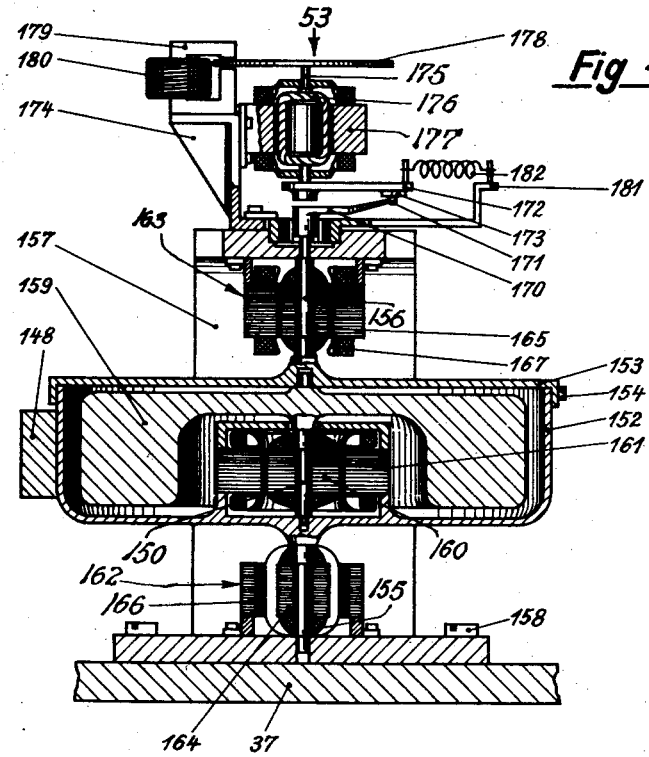
Fig. 14 is a vertical section of an integrator with the associated parts.

It should be noted that the current feeding parts are not shown in Fig. 14 in order to keep the drawings as simple and clear as possible. Parts as they are used to convey the current are generally known and are indicated, for example, in Fig. 3 as collector rings 60.

The equivalent parts of the integrator 54, which is of similar construction, have, as far as they are referred to here below, been given the reference numbers 150' to 182'. The moment generator on the azimuth gyro 50, referred to in an aforegoing part of the description, is similar in construction to the one described above, and its parts, as far as they are mentioned here, have been given the reference number 176'' and 177''.

Figure 15:
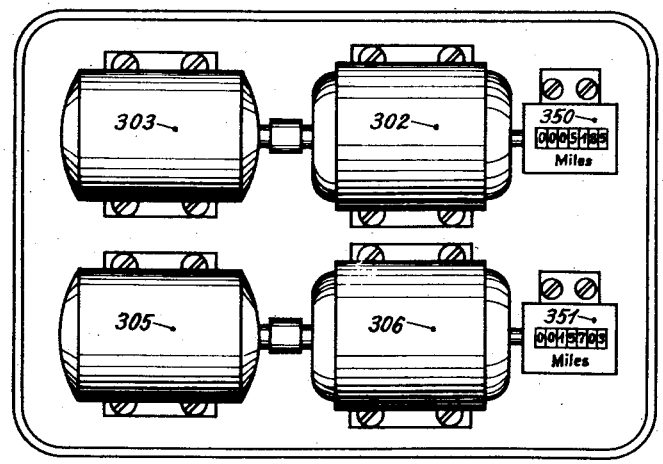
Fig. 15 shows a top view of a device for reading the number of revolutions of the integrators.

It has already been stated that the swinging motion of case 152 of the integrator 53 controls a motor 302 which rotates a transmitter 303 and is equipped with a counter mechanism 350 similar to a revolution counter (see Fig. 15). In a similar manner the case of the integrator 54 controls a motor 306 which actuates a transmitter 305 and is equipped with a counter mechanism 351. As will be explained later, the number of revolutions made by motor 302 is proportional to the distance covered by the so equipped craft in that direction in which the acceleration effects are present and to which the integrator 53 responds. The counter 350 can thus be calibrated in miles directly instead of in numbers of 30 revolutions. The counter 351 associated with integrator 54 is also calibrated in miles. The integrators 53 and 54 are so arranged, however, as to respond to accelerations lying at right angles to each other. Thus the root of the added squares of the values indicated by counters 350 and 351 represents, according to the Pythagoras theorem, the covered distance measured in its true direction.

In order to explain the operation of the integrator let it be assumed for sake of argument that there is no motor 302 with transmitter 303, but that the contacting means 170 to 173 is adapted to directly supply the electric motor 160, 161 of the integrator (Fig. 14) with current. The current will be switched on when the oscillatable mass swings in one direction or the other, and will create a force between armature 160 and field 161 of such a direction and magnitude as corresponds to the deflection of the swinging mass. This force tends to accelerate or to retard the speed of the armature relatively to the field which is rigidly connected with the oscillatable mass. Simultaneously a counter force of equal magnitude arises, as is well known in mechanics, which tends to turn the field relatively to the armature in the opposite direction. In other words, if the oscillatable mass swings upon an acceleration for instance in clockwise direction, the force induced by the contacts will accelerate the armature in the same direction while the counter force returns the swinging mass to its original, central or neutral position. In this neutral position the current is switched off, and, consequently, the force and the counter force disappear. The armature, however, continues to rotate relatively to the stationary part of the apparatus, due to its inertia which may be enlarged by that of the mass 159, and if all retarding causes are practically eliminated, it maintains the speed which it has acquired until a new force either increases or decreases this speed due to a deflection of the oscillatable mass in one direction or the other.

Thus, the oscillatable mass is moved only when accelerations occur, and under all other conditions it is at rest in relation to the craft. The parts 159 and 160 become accelerated by forces corresponding to those which return the oscillatable mass to its neutral position in each instance. Parts 159 and 160 on the other hand, have at any time a speed corresponding to the component of the craft's ground speed in the direction of the acceleration to which the oscillatable mass responds due to the position of the integrator.

These conditions are maintained even if forces other than those due to acceleration of the oscillatable mass occur, as for instance if owing to bearing friction between parts 160 and 161, part 161 with the oscillatable mass 148 gradually moves out of its neutral position while part 160 keeps on rotating. As a result of this, the current is switched on again by the contacting device 170 to 173 until part 161 with 148 has been returned to the neutral position, and part 160 has regained its former speed. It will be noted that the deflections of the oscillatable mass due to bearing friction always occur in a sense corresponding to that of the rotation of the rotor. Such deflections, however, supply a current which accelerates the motor in the same sense as the prevailing rotation. In this manner the losses of energy will be compensated, and it is obvious that the instrument functions not only under ideal conditions but also under those occurring in practice.

In the foregoing, it has been assumed that the contacting device directly supplies the motor 160, 161 with current. In the example of this specification, the contacting device 170 to 173 controls the circuit feeding the motor 302 coupled with transmitter 303 which in turn supplies the motor or receiver 160, 161 with current. As will be apparent, such arrangement does not imply any alteration of the principle. In this case, motor 302 and transmitter 303 and receiver 160, 161 always have either the same speed or at least speeds proportional to the component of the ground speed. The sum of the revolutions of either one of the three is at any time the integral of the speed over time, and hence a measure for the distance traversed by the craft in the direction of the component in correspondence with which the integrator is established. Therefore the revolution counter 350 is suitable to directly indicate such distances no matter with which of the three machines 160, 302, and 303 it is coupled.

The arrangement illustrated in the drawings with motor 302 and transmitter 303 has several advantages over that discussed above in which these parts are absent, namely, first motor 302 facilitates the mounting of counter 350; secondly, all indicating instruments may be arranged at any desirable place on the craft while only the integrators and the gyros are mounted on the platform; third, the three receivers controlled by the transmitter 303, that is, receiver 160, 161 of the integrator, receiver 407 of the course and speed indicator, and receiver 474 of the distance instrument, are more easily kept synchronous than would be possible if they were directly controlled by the contacting device. In the case of the apparatus illustrated, which includes a motor 302 and a transmitter 303, the principle of operation will be the same as in the case discussed above, where the absence of the elements 302, 303 has been assumed. To show this, let it be assumed that the craft is in motion, and that the oscillatable mass is in its center position; this means that the craft is moving with constant speed, no accelerations prevailing at the time being. Consequently, motor 302, transmitter 303, and receiver armature 160 are also rotating with constant speed. Let us assume clockwise rotation. If now, on account of bearing friction, the speed of motor 302 and transmitter 303 is gradually retarded, then receiver 160 operating in synchronism with transmitter 303 will also become retarded, because the current between both these machines acts as a braking current. This current creates a torque acting between field and armature in such a manner that it tends to rotate the armature 160 relatively to the field 161 contra-clockwise and the counter torque simultaneously created tends to rotate the field together with the oscillatable mass relatively to the rotor in a clockwise direction. As a result, the armature will not only be retarded, but the oscillatable mass also is caused to swing in the clockwise direction, thereby closing the contacts feeding motor 302 to accelerate the latter. Thus the speed of the rotating parts will again be accelerated until the counter torque accompanying the acceleration of armature 161 has returned the oscillatable mass to its neutral position.

Devices have already been mentioned employed to compensate the effect produced by the bearing friction of the platform.

Fig. 16 shows one of the shaking devices 55 and 56 which are of equal construction and are employed on the platform directly. The shafts of the shaking devices are arranged at right angles to each other. The description refers to arrangement 55. On platform 37 are the supports 183 in which a flywheel 184 is mounted so as to be capable of rotating. The said flywheel is connected with platform 37 by means of a light zero spring 185 through arm 186. The shaft 187 of the flywheel is intentionally subjected to a certain amount of friction in its bearings in the supports 183. The ends of the said shaft carry armatures 188 and 189 lying in the alternating fields 190 and 191 respectively. The armatures and fields may suitably be designed as the well known phase shifters with symmetrically displaced short-circuit windings and are surrounded by the cases 192 and 193 respectively. Fig. 27 shows the circuit of the field windings. The corresponding parts of the shaking device 56 are numbered 183' to 193'.

The shaking devices 134 and 135, referred to in describing Fig. 9, which are arranged on shaft 133, are constructed in a manner similar to those shown in Fig. 16 so that the parts numbered 134 and 135 correspond to the cases 192 and 193 with the phase shifters housed inside these cases. The connection of the field windings may be the same with all the shaking devices; a type of connection may, however, also be used in which, as illustrated in Fig. 27 in connection with the shaking devices 134, 135, not two but three coils each (194, 195, 196) are Y-connected. Depending on which of the two connections is used, certain means have to be employed for controlling the exciting current of the field coils.

The means necessary for controlling the alternating fields, e. g. 190, 191 (Fig. 16), which belong to a set of shaking devices with twin-coil field winding, are illustrated in Figs. 17 and 18. They essentially consist of a motor 304 with a device for periodically changing the position of the switching elements which is mounted on or outside platform 37 at any point of the craft and whose switching elements may be connected via collector rings 60 with the shaking devices of the platform instruments. For this purpose the motor 304 which is rigidly connected with its armature shaft 197, is equipped with two contact arms 198, 199 arranged side by side on one and the same radius; the said contact arms are jointly fed by way of a collector ring 200 with stationary brush 201. The contact arms 198 and 199 differ in length and move opposite two contact half-rings 203 and 204 displaced essentially through 180 degrees and each exceeding the length of a semi-circle; the said contact half-rings are mounted on a frame 202 or the like. The contact half-rings 203 and 204 overlap by as much as is required to set up the alternating field. This is illustrated by the magnetization curves given in Fig. 19. The contact half-ring 203 is electrically connected with the field coil 191 and the contact half-ring 204 with field coil 190. With the motor 304 caused to rotate continuously, the contact device 198 to 204 effects a rhythmically alternating excitation of the shaking devices. As already stated above, shaft 187 of flywheel 184 (Fig. 16) is intentionally subjected to a certain amount of friction in its bearing provided in the support 183. This friction serves to generate at the reversing points of the shaking movement a definite and permanently alternating moment which likewise alternates rhythmically but is displaced in phase by 90 degrees as compared with the moment produced by the alternating fields.

The fields of the shaking devices 134, 135 and 143, 144 are represented in Fig. 27 as rotating fields, i. e. as three-phase alternating fields, contrary to the fields described above, since two-phase and three-phase fields can be used with equal success for shaking devices of this kind. The device for controlling these three-phase alternating fields may be derived from Figs. 17, 18b, and 27. It is shown on the left end of shaft 197 of motor 304. The fixed contact half-rings 205, 206 are arranged in a similar manner as half-rings 203 and 204. Four contact arms 207, 208 and 207', 208' insulated from each other, are mounted on shaft 197, all of them being arranged on the same diameter. The contact arms 207 and 207' are capable of sliding along the half-ring 205 and contact arms 208, 208' along half-ring 206. The current is fed to each contact arm 207, 208, 207', 208' by a separate slip ring 209 (and 210, 209', 210' respectively) with brush 211 (and 212, 211', 212' respectively). The connection of contact arms and half-rings with the field coils of the phase shifters will be dealt with later on, in connection with Fig. 27.

Attention is drawn to the fact that all shaking devices of all parts or instruments only require one common controlling device provided the field windings are of equal type. Thus, the shaking devices 55, 56 on platform 37, furthermore, 162 and 163 on the integrator 53 as well as 162', 163' on integrator 54 are all controlled by the arrangement 198–204, and likewise the shaking devices 134, 135 and 143, 144 on the compass gyro by the arrangement 205–212. These two controlling devices may, however, also be driven by one and the same motor (304) as shown in the illustration.

In the shaking devices dealt with so far only the shafts of the inertia masses or the parts mounted on these shafts are shaken. In the shaking devices 57—58 (see also Figs. 2 and 27) described below and illustrated in Fig. 20 not only the shaft is shaken but also the two bearings in which the shaft is capable of rotating. This shaking device is preferably employed in conjunction with the bearings of the platform 37 of the gimbal rings 32 and 33. The two parts of the shaking device, belonging to the same shaft, are preferably displaced in phase. At the reversing points of the movement of one of the shaking devices a torque is obtained by this phase displacement, resulting from the movement of the other shaking device.

The platform 37 illustrated in Fig. 20, with its mounting 38, is supported by the vertical shaft 36. Shaft 36 is so arranged in the gimbal ring 33 as to rotate freely. For this purpose the said shaft is provided with an upper ball bearing 213, the outer ball race (214) of which is arranged in a hub piece 215 capable of rotating with the bearing surface 216 in the gimbal ring 33. A cover ring 218 rigidly connected with the hub piece 215 by screws 217, protects both, the ball bearing 213 and the hub piece 215, from axial displacement with respect to the gimbal ring 33. In a similar manner shaft 36 has a ball bearing 219 on its lower end with an external ball race 220 which is arranged in a bushing 222 provided with a flange 221. The inner ball race 223 of the ball bearing 219 is supported, with an intermediate ring 224, on a spherical thrust bearing 225 which bears on the bottom 226 of bushing 222. Ball bearings 219 and 225 are secured by a nut 227 screwed into bushing 222. Bushing 222 is capable of rotating, with its bearing surface 228, in the gimbal ring 33 and is protected against axial displacement by the flange 221 as well as by a hub 230 connected with the said bushing by screws 229.

The upper extension 231 of shaft 36 carries the armature 232 for rotating field 233 which is attached to the gimbal ring 33 by means of the holding device 234. The external circumference of the above mentioned hub piece 215 is provided with a toothing 235 which is meshed with a toothed wheel 236 which, in turn, is mounted on the shaft 237 of a friction reverse gear. The said gear has a center coupling piece 238 which, together with two armature discs 239 and 240 is mounted on the shaft 237; shaft 237 is capable of moving to and fro in the direction of the shaft, due to the pot-shaped magnets 241, 242. Thereby the coupling piece which has jaws 243, 244 on either side, is enabled to mesh alternately with jaws 245 and 246 respectively of the bevel gears 247, 248 so as to reverse the direction of rotation of the shaft. The bevel gears 247 and 248 are mounted, for this purpose, in parts 249, 250 of a support 251 fixed on the gimbal ring 33 and on the shaft 237; the said bevel gears mesh with a bevel gear 252 which is mounted on the shaft 253 of a continuously rotating electric motor 254 supported by gimbal ring 33. The motor shaft 253, also carries the contact arms 255, 256, 257 of which arm 255 serves to commutate the current fed to the pot-shaped magnets 241, 242 and the arms 256, 257 for commutating the rotating field 233. The latter commutation as compared with that of the pot-shaped magnets 241, 242 can be displaced in phase. Current is fed to the contact arms 255, 256, 257 by way of the associate collector rings with brushes 255a, 256a, 257a. The arc-shaped counter contacts 258, 259 (260 and 261 respectively) are fixed on the support 251 by a frame 262 and can be seen in Fig. 27.

The hub 230 at the bottom end of the shaft 36 is provided with a toothing 263 on its circumference. The said toothing meshes with a device similar to the toothing 235 on the other end of the shaft 36. As far as these parts are shown in Figs. 20 and 27, they are given the corresponding reference numbers 236'–262'; in connection with parts 236'–262', however, there is no device for commutation corresponding to arms 256 and 257 and counter contacts 260 and 261 respectively since, in this case, a shaking device corresponding to the above device 232, 233 is dispensed with. Caps 264 and 265 cover the parts projecting from the gimbal ring 33 and are fixed on same by screws 266 and 267.

It is desirable to have the pot magnets 241, 242 reversed with a certain time lag as compared with the reversing of the corresponding magnets 241', 242'. The said time lag occurs practically automatically since the motors 254, 254' will never operate with the same R. P. M., i. e. arms 255, 255' will practically always make contact at different times. If, however, all four magnets happen to be controlled by one and the same motor (254), which may certainly be the case, it is best to arrange the necessary contact arms 255 and 255' at a definite angle to each other.

Means are provided to indicate by an apparatus both ground course and speed, and also to communicate the direction for the apparent earth rotation to the stabilizing gyros of the main apparatus. Figs. 21–23 illustrate an apparatus of such type. In a case 400 is arranged a continuously rotating electric motor 401 mounted on the bottom of the case and having a vertical shaft 402 which continuously drives a friction plate 405 through the toothed gears 403 and 404. Above the friction plate 405 is arranged a spindle 406 actuated by a receiver 407, which, in turn, receives the pulses from the same transmitter (303) and is used to operate the receiver 160, 161 of the associated integrator 53 mounted on platform 37. On the said spindle, a bevel-friction differential gear 408 with a differential star 409 is arranged which also carries the nut 410 for the spindle 406 and the epicyclic gears 411. The gears 411 are meshed with the bevel gears 412 and 413, the hubs of which form the friction gears 414 and 415 respectively which operate in contact with the friction plate 405. Gears 412 and 413 are mounted on the nut 410 so as to rotate freely. The friction gears are embraced by the double arm 416 in which the gears rotate freely without being subject to displacement so that arm 416 in the case of a displacement of nut 410 is moved in the direction of the spindle. Arm 416 has an extension 417 provided with a guide slot 418 for a pin 419. It should be noted that the spindle 405 is mounted on two trestles 420 and 421 which are screwed to the bottom of the case 400 by screws 422 or the like. In the same trestles (420 and 421) are arranged cross arms 423, 424 rigidly connected with the end of the double arm 416 and capable of sliding at 425 and 426.

A device of equal construction with friction plate 427, which is likewise actuated by the motor 401 through the pinion 403, spindle 428 and bevel-friction differential gear 429, is arranged at right angles to the aforementioned device. Spindle 428 is actuated by the receiver 453 which is likewise acted upon by the transmitter 305 (see Figs. 15, 26, 29) as in the case of receiver 160', 161' of the second integrator 54. The double arm 430 operates in connection with the differential gear 429; the said arm is provided with an extension 431 and cross arms 432 and 433 are guided in the trestles 445, 446. The extension 431 is provided with a slot 434 in which pin 419 is guided also. Thus, the position of the said pin is clearly determined by the guide slots 418 and 434. Pin 419 carries a needle 447 which is arranged opposite a pane of glass 448 in the opening 449 of the case cover 450, so that the momentary position of the needle 447 indicates course and speed over ground on the glass scale which is provided with both radial (451) and concentric (452) graduation. By the position of the needle 447 relative to the centre the speed is indicated on the concentric graduation and the course over ground on the radial graduation.

The device above described is equipped with a contrivance to communicate the above mentioned corrections for the apparent earth rotation to the stabilizing gyros 40 and 41. The said contrivance consists of a rack bar 454 connected with the cross arms 423, 424 of the double arm 416. A pinion 455 meshes with the rack 454, which is mounted on the armature shaft 456 of the transmitter 457 and actuates same when the arm 416 is laterally displaced. Transmitter 457 acts upon receiver 77' (Figs. 8, 26, 28) and communicates the corrections for the apparent rotation of the earth to the north-south stabilizing gyro 40. Correspondingly, a rack 458 is also provided on the cross arms 432, 433 of the double arm 430, which acts on transmitter 460 through pinion 459 (Fig. 28). Transmitter 460 operates the corresponding receiver 77 (Figs. 6, 26) of the other stabilizing gyro 41.

Figs. 24 and 25 show a contrivance which, in conjunction with the apparatus above described, is capable of indicating at any moment the positions of the craft equipped with the contrivance under discussion. On a base plate 461 are arranged brackets 462, 463, 464, and 465 on which two pairs of parallel rollers 466, 467 and 468, 469 are mounted so as to rotate. The two rollers 466, 467 are connected with each other by belt drive (470) or the like and the rollers 468, 469 by belt drive (471) or the like so as to operate synchronously. The two sets of rollers are displaced through 90 degrees in their respective directions. The one roller 467 belonging to the pair 466, 467 is rigidly mounted on the armature shaft 472 of the receiver 473 acted upon by the transmitter 305 which is driven by motor 306 (see Figs. 15, 29). Correspondingly, the other set of rollers 468, 469 is actuated by the receiver 474 which is acted upon by the transmitter 303 which, in turn, is operated by the motor 302. The transparent strips 475, 476 of paper or of similar material, can be placed on two opposite rollers each in such a manner that the strips begin to move on rotation of the rollers. On these paper strips the distance to be traversed by the craft is shown in such a manner that on one strip (476) the distances from place to place are indicated as differences in geographical longitude (490) of the various places and on the other strip (475) as differences in geographical latitude (491). Before starting, both strips are adjusted one above the other, so that the starting point lies in the centre of a graticule 477 supported by a slide 478 in a window 479.

Suitable means are provided to compensate the errors due to the distances being plotted on the paper strips 475, 476 by rectangular coordinates in form of a Mercator's projection. To be able to determine the true position, a corresponding correction is required. To this end, the slide 478 passes along a bar 480 mounted on the supports 462, 463. Slide 478 carries a stop 481 meshing with a spline 482 of a worm 483 which is driven by the gears 484 and 485 of the same receiver 474 as is also employed to move the paper strip 475. The turns of worm 483 are cut so that the slide 478 with the graticule 477 moves out of the center position on rotation of receiver 474 and roller 468 to either the left or the right, so far as corresponds to the correction of the Mercator's projection.

In the following the electrical connections are described in accordance with drawings 1 and 26–31. Parts of groups A and B (A representing the gyroscopes arranged on platform 37 and B the shaking devices) are more or less connected with each other as may be derived from the above description; thus, for example, the shaking devices 134, 135 and 143, 144 belonging to group B are incorporated in the gyro (according to Fig. 9) of group A. For simplicity's sake, however, and to render the circuit diagrams as clear as possible, only the parts of group A are to be found in the diagram of Fig. 26, and only the parts belonging to group B in the diagram of Fig. 27.

In Fig. 26, a three-wire system 3 ~ for three-phase current, a two-wire system = for direct current, and a two-wire system ~ for single-phase alternating current are connected up through slip rings 60 arranged on the left-hand side. These conductors are distributed over the slip rings and branched off into the single conductors R, S, T for three-phase current, + and − for direct current and r, s for single-phase current. On the right-hand side connecting leads a, b, c, d, e are run to groups C, D, E, F, the individual conductors being connected to the slip rings 68 and separately numbered for each cable. Thus, as may be derived from the diagram, the cable a is composed of 6 individual conductors 1–6 each of which is clearly marked by one of the designations a1, a2, a3, a4, a5, a6.

The two conductors a5 and a6 are directly connected with the D. C. conductors + and − respectively, and the conductors b1 and b2 supply the direct current to group C, as shown in Fig. 1. In a similar manner the conductors c1, d1, and e1 constitute extensions of the single-phase conductor s, and conductors c8, d8 and e8 extensions of the other single-phase conductor r.

The chain-dotted lines enclose all those parts as belong to each individual apparatus. The fields thus obtained are given the same reference numbers as are applied to these apparatus in the foregoing description, viz:

40 for the north-south gyro (Figs. 4, 7, 8).
41 for the east-west gyro (Figs. 4, 5, 6).
46 for the compass gyro (Figs. 9, 10, 10a).
50 for the azimuth gyro (Fig. 11).
53 for the north-south integrator (Fig. 14).
54 for the east-west integrator (Fig. 14).

As already mentioned above, the gyros 40, 41, 46, and 50 are suitably constructed as asynchronous motors and as such generally equipped with a short-circuited armature and a three-phase field 500 (501, 502, 503) in star connection. The three field coils are thus connected with each other at one end each, the open coil ends being connected in the case of all four gyros to the conductors R, S, T. The fields 504, 505, 506 of the receivers 77′, 77, 78 connected with the gyros 40 and 41 are joined to the single-phase conductors r, s. 77′ and 77 serve for making corrections in accordance with the apparent rotation of the earth, and 78 in accordance with the true earth rotation. The armature windings 507, 508 of the receiver 77′ or 77 respectively are connected with the transmitters 457 and 460 respectively of group C (see Figs. 22, 28) by way of the conductors c1, c2, c3 and c4, c5, c6 respectively, the armature windings 509 of receiver 78 being connected to the transmitter 300 of group F (see Figs. 12, 13, 30) via conductors e1, e2, e3. The receiver 78′ of the azimuth gyro 50 and receiver 677 of the compass gyro 46 are wired in a similar manner. The fields 510 and 610 are fed through the two single-phase conductors r and s, and the armature windings 511 are connected through conductors e4, e5, e6 with the transmitter 301 of group F, the armature windings 618 being connected in parallel to the armature windings 507 of the receiver 77′ and joined to the transmitter 457 of group C through conductors c1, c2, c3.

The two field coils 177″ of the moment generator at the azimuth gyro are connected in series and joined to the D. C. conductors +, —. One end of each of the armature coils 176″ is connected to the — conductor, the two other ends being connected with the contact 126 or 127 of one of the contact making devices provided at the compass gyro 46. The associate contact arm 124 is connected to the contact surface 123 of the other contact making device and finally the contact arm 121 is joined to the + conductor. As may be seen in the diagram, current only flows through one of the coils 176″ when the contact arm 121 is in the center position and the contact arm 124 is outside this position. As the two coils 176″ are wound in opposition the armature equipped with coils 176″ rotates in one direction or the other, depending on whether the contact arm is on contact 126 or 127; on disconnecting the resistances 512, 513 between the individual contacts 126 and 127 respectively the magnitude of the torque increases the further the arm 124 moves out of its centre position.

The field 138 of the eddy-current brake of the compass gyro 46 is connected with its two ends to the D. C. conductors +, —.

The fields 161 or 161′ connected with the cases of the integrators 53 and 54 are fed through the conductors r, s carrying single-phase current. The associate armature coils 160 of the integrator 53, which are correlated to the inertia masses, are connected with the conductors d1, d2, d3 leading to transmitter 303 (Figs. 15, 29) of group E, and armature coils 160′ of integrator 54 are connected with the armature coils of the transmitter 305 through conductors d4, d5, d6 in a similar manner.

The moment generators of the integrators, which are constructed on lines similar to the above mentioned moment generator of the azimuth gyro, are connected with the conductors +, — of the D. C. system through their two-coil fields 177 and 177′ respectively. The associate armatures 176 and 176′ carry two coils, both coils of each armature being connected with one another at one end each and, at the same time, to the minus conductor of the D. C. supply. The open coil ends of armature 176 on the integrator 53 are connected through conductors a1, a2 with the field coils of the electric motor 302 (Figs. 15, 29) and, in parallel to same, joined to the external subdivisions 173 of the contact segment 172. Resistances 514 are inserted between the individual contact subdivisions 173. Contact arm 170 opens contact 173, when in its center position. The said contact arm is connected to the + conductor for D. C. The moment generator 176′, 177′, together with contact segment 172′ and contact arm 170′ is connected in a similar manner, the only difference being that the open ends of the armature coils 176′ are passed to the field coils of the electric motor 306 through conductors a3, a4.

The windings 180, 180′ of the eddy current brakes are connected to the D. C. +, — conductors.

Fig. 27 shows a schematic wiring diagram of all shaking devices, i. e. also those parts belonging to group B. The rectangular section in the middle having the reference number 37. Inside this quadrangle the parts belonging to a definite instrument are enclosed by a dotted line, the fields thus obtained being marked with the reference number of the corresponding instrument. Thus, the quadrangle 37 corresponding to the platform contains a chain-dotted field 53 in which are to be found the shaking device on the integrator 53 according to Fig. 14, a field 54 for the shaking device of the integrator 54 according to Fig. 14, a field 55 for the special shaking device 55 according to Figs. 2 and 16, a field 56 for the special shaking device according to Figs. 2 and 16, and finally a field 46 for the shaking devices of the compass gyro 46 according to Fig. 9.

Above quadrangle 37 for the platform, a rectangle 57 is contained in Fig. 27 and below the quadrangle 37 a rectangle 58 on the left side. These contain the circuits for the shaking devices 57 and 58 respectively which in Figs. 3 and 20 are indicated as being arranged on the supporting ring 33 of platform 37. The field in the bottom right-hand corner having the reference number 515 contains the circuit connections for the control of all shaking devices illustrated in Figs. 17, 18a and 18b.

Fig. 27 only contains the wires necessary to elucidate the circuit connections of the shaking devices. A large number of the slip rings 60 in this drawing are, therefore, not connected up since they are only of importance with respect to group A according to Fig. 26. The shaking devices 55, 56 as well as those of the integrators 53 and 54 are provided with two-coil alternating fields with a short-circuited armature rotating in same. Considering that all these shaking devices are connected in similar manner, the circuit will only be explained with reference to the shaking devices 162, 163 of integrator 53. As may be seen from the diagram, the coils 166 and 167 are connected in series and one end of each of a pair of coils 166 and 167 are interconnected. At their junction point 516 the coils 166 and 167 are connected to the conductor s of the single-phase supply. The open end of the coils 166 is connected with the contact half-ring 203 of the controlling device 515 and the open end of the coils 167 is joined to the contact half-ring 204 of the same controlling device. Thus, the open ends of the coils 191 of the shaking device 55, coils 191' of the shaking device 56, as well as coils 166' of the shaking device of integrator 54 are connected with the half-ring 203, and the open coil ends 199, 198' and 167' with the contact half ring 204. The contact arms 198 and 199 actuated by the motor 304 are connected with conductor r of the single-phase supply. As may be derived from the diagram, the motor 304 is wired as a direct current shunt-wound machine and is thus connected to the two D. C. conductors +, —. It now becomes evident that, with motor 304 rotating the contact arms 198 and 199, an alternating current will flow through coils 166, 166', 191, and 191', as long as the contact arm 198 is on the contact half-ring 203; it is, furthermore, evident that, in a similar manner, coils 167, 167', 198, and 198' will carry current as long as the contact arm 199 slides along the contact half-ring 204. Thus, constantly alternating torques are set up by the shaking devices 162, 163 on the shafts 155, 156 of integrator 53 (Fig. 14). In a similar manner shafts 155', 156' of integrator 54 as well as the inertia masses 184 or 184' on the shaking devices 55 or 56 receive constantly alternating torques.

As already stated above, three-phase fields, as they are indicated in the shaking devices of the compass gyro, may also be used in place of two-coil alternating fields for the shaking devices. The compass gyro 46 has two pairs of shaking devices 134, 135 and 143, 144. The armatures 517, 518, 519, and 520 of the said shaking devices are constructed as short-circuit armatures similar to those previously mentioned, the fields being designed as star-connected three-phase fields. The three coils of the rotating field associated with the shaking device 134 are numbered 194, 195, 196. Correspondingly the shaking device 135 has the rotating field 194', 195', 196', the fields 521, 522, 523 and 521', 522' and 523' respectively belonging to the shaking devices 143, 144. To control these rotating fields the control device shown in Figs. 17 and 18b is provided, in which the electric motor 304 turns the contact arms 207, 207', 208, 208' so that these are capable of sliding along the contact half-rings 205 and 206 respectively. The circuit connections are such that the contact half-ring 205 is connected to the conductor S and half-ring 206 to a second conductor T of the three-phase-current supply 3 ~. The open ends of the coils 196' and 521' are joined to the contact arm 207. Contact arm 207' is similarly connected to the open ends of the coils 195 and 523, contact arm 208 to coils 196 and 522, and contact arm 208' to the coils 195' and 522'. The four other coils viz. 194, 194', 521 and 523' are all connected to the third conductor R of the three-phase supply 3 ~. It is evident that, for example, in the case of contact arm 207 being on contact half-ring 205 and contact arm 208' on half-ring 206, with the other contact arms not making contact with the half-rings, the coils of the shaking devices 135 and 144 will carry current since coils 194' and 523' are connected to the three-phase conductor R directly, whereas coils 195' and 522' are joined to the three-phase conductor T via contact arm 208' and contact half-ring 206, and coils 196' and 521' to the three-phase conductor S through contact arm 207 and contact half-ring 205. If the contact arms move in such a manner that the contact arm 207' slides over the contact half-ring 205 and contact arm 208 along the half-ring 206; the rotating fields of the shaking device 134 and 143 are connected in a similar manner with the three-phase conductors R, S, T.

The shaking devices 57 and 58 (Figs. 2 and 20) connected with shaft 36 of platform 37, are provided with the shunt-wound motors 254 and 254' respectively and correspondingly connected to the +, — conductors of the D. C. supply. The motor 254 actuates a contact arm 255 capable of sliding along the contact half-rings 258, 259 and serving the purpose of controlling the windings 524 and 525 of the pot-shaped magnets 241 and 242 respectively. The coils 524 and 525 are connected with one end each at point 526. This junction (256) is connected with the — conductor. The open end of coil 524 is connected with the contact half-ring 259 and the open end of coil 525 with the contact half-ring 258. Thus, when the contact arm 255 is being turned by the motor 254 and slides over the contact half-ring 259, current is fed from the + conductor through contact arm 255, contact half-ring 259 and coil 524 to the — conductor. When contact arm 255 reaches the contact half-ring 258, the coil 525 is correspondingly excited and thereby the coupling piece 238 (Fig. 20) caused to move to and fro. In a similar manner the motor 254' drives the contact arm 255' which is capable of sliding along the contact half-rings 258' and 259'. The magnet coils 524', 525' of the pot-shaped magnets 241', 242' are connected with the controlling device in the same way as the windings 524 and 525.

In addition, the motor 254 actuates the contact arms 256, 257 which are arranged diametrically opposite each other and are capable of sliding on the contact half-rings 260, 261. The contact device serves for commuting the rotating field 233 within which the short-circuit armature 232 is capable of moving. The rotating field is built up by the coils 527, 528, and 529.

The coils are star-connected, and the open ends of coils 527 and 528 are connected to the contact arms 256 (and 257 respectively), the open ends of coil 529 being joined to the R conductor of the three-phase supply 3 . The contact half-ring 260 is connected with the three-phase conductor S, and contact half-ring 261 with the three-phase conductor T. It is evident that a reversal of the phases takes place when the contact arms 256 and 257 pass from one contact half-ring to the other (260 and 261 respectively) in rotating. Hence, a torque changing in direction is set up on the armature 232 and accordingly also on shaft 231 (see Fig. 20).

Fig. 28 shows the connection of the parts belonging to group C, i. e. the electrical connection of the contrivances belonging to the speed indicating apparatus (Figs. 21, 22, 23). Cable bundles b and c of group A (Fig. 26) are connected with this apparatus. On the other hand, the two cable groups g and f are branched off this apparatus. The cable groups g and f are so arranged with their individual conductors that $g1$ and $f1$, $g2$ and $f2$ ... $g6$ and $f6$ are interconnected. Cable bundle $g$ runs to group D and bundle $f$ to group E.

As already described above, the electrical contrivances of the apparatus belonging to group C consist of a motor 401 connected as shunt-wound motor and joined to the two conductors $b1$ and $b2$ which, as shown in Fig. 26, constitute the $+$ or the $-$ conductor of the D. C. supply.

There are, furthermore, the two transmitters 457 and 460 as well as the two receivers 407 and 453. As will be seen from Fig. 21, the receiver 407 is geared to the transmitter 457, and receiver 453 to transmitter 460. The field coils 530, 531, 532, 533 of the respective receivers 407, 453 and transmitters 457, 460 are connected to the conductors $c7$ and $c8$ which are identical with the single-phase A. C. conductors $r$, $s$ (see Fig. 26). The armature coils 534 of the receiver 453 are connected with the armature coils 537 of the transmitter 305 (Fig. 29) of group E by way of the conductors $f1$, $f2$, $f3$. The armature coils 535 of the receiver 407 are connected in a similar manner through conductors $f4$, $f5$, $f6$ with the armature coils 536 of the transmitter 303. Single-phase current is fed to the field coil 538 of the transmitter 303 as well as to the field coil 539 of the transmitter 305 (Fig. 29) through conductors $d7$, $d8$. The armature coils 540 (Fig. 28) of the transmitter 457 are connected through conductors $c1$, $c2$, $c3$ with the armature 507 of the receiver 77' at the north-south gyro 40, and the armature coils 541 of the transmitter 460 through conductors $c4$, $c5$, $c6$ with the armature coils 508 of the receiver 77 at the east-west gyro 41 (see Fig. 26). The receivers 474 and 473 of group D are connected in parallel to the receivers 407 and 453 through the cable bundle $g$, the device for direct position finding thus operating simultaneously and proportionally with the speed indicating apparatus.

Hence, it is evident that the receivers 474 and 473 as well as the receivers 407 and 453 operate as soon as the transmitters 303 and 305 begin to work. Since, however, the receivers 407 and 453, as already stated, are geared to the transmitters 457 and 460 respectively these transmitters will also be actuated so that they can operate the receivers 77' and 677 (and 77 respectively).

As may be derived from Fig. 15, the transmitters 303 and 305 are driven by two electric motors 302 and 306 respectively. The said motors (see Fig. 29) are shunt-wound motors the armatures 550 and 551 of which are fed with D. C. through conductors $a5$ and $a6$. The motor 302 has two field coils 542, 543 wound in opposition and the motor 306 has two field coils 544 and 545 likewise wound in opposition. One end each of the field coils 542, 543, 544, 545 is connected to the negative D. C. conductor through $a6$. The other end of the winding 542 is joined to the other side of the contacts 173 on the contact segment 172 through $a1$, the other end of winding 543 being connected via $a2$ to the other side of the contacts 173 (see Fig. 26). A corresponding connection is provided between the open ends of coils 544 and 545, through conductors $a3$ and $a4$, and the two contact sides of the contact segment 172'. It is thus evident that the electric motors 302 and 306 are dependent on the deflections of the contact arms 170 and 170' respectively, with respect to the magnitude of their torque as well as their sense of rotation, or, in other words, the motors 302 and 306 are controlled by the integrators 53 and 54 respectively.

The transmitters 300 and 301 of group F are likewise transmitters of the usual type. Single-phase current is conveyed to their field coils 546 and 547 through conductors $e7$, $e8$. The armature coils 548 of the transmitter 300 are connected through the conductors $e1$, $e2$, $e3$ with the armature coils 509 of the receiver 78 at the east-west gyro, the armature coils 549 of the transmitter 301 being joined to the armature coils 511 of the receiver 78' at the azimuth gyro, through conductors $e4$, $e5$, $e6$.

The operation of the described device according to the present invention is as follows:—

The leads R, S, T, (Fig. 26) of the platform 37 are connected with the three-phase supply, and the D. C. conductors $+$ and $-$ with the D. C. supply, the single-phase conductors $r$ and $s$ being joined to the single-phase A. C. supply. The field coils 500, 501, 502, 503 of the two stabilizing gyros 40, 41, of the compass gyro 46 and of the azimuth gyro 50 are fed from these sources; the said coils are connected to the abovementioned conductors R, S, T. As soon as the gyros reach their necessary speed of revolution they either move the platform 37 into the correct position or maintain it in this position. As the gyro 46 is constructed as compass gyro and suspended in the manner described, it tends, as is well known, to adjust itself with the impulse shaft to the meridian so that this shaft indicates the north-south direction at all points of the globe with the exception of a certain region near the north pole and a further region close to the south pole.

The compass gyro 46 (Fig. 9) is a so-called inactive gyro which tends to find its most suitable position in space without itself turning the platform into a definite direction by means of some kind of moment set up on its bearings. If, however, the gyro shaft 49 happens to be in a position other than the zero position, relative to the platform 37 or to the case connected with same, i. e. if the diameter of the platform which is supposed to have a north-south direction, is not in parallel to the impulse shaft 49 of the compass gyro, then the contact arm 124 will have passed over to one of the contacts 126 and 127. Current thus flows from the D. C. conductor $+$ through contact arm 121, contact 123, contact arm 124, contact 126 (127) to one of the armature coils 176" of the moment generator in the case 147 of the azimuth gyro 50 (Fig. 11) and thence back to the D. C. conductor $-$. Since the field windings 177" of the moment generator are excited as soon as the said current source is connected to the $+$ and $-$ conductors of the platform, a torque is set up which tends to tilt the gyro 50 about the shaft 51. To a moment of this kind the gyro responds with a precession on a vertical axis by giving rise to a torsion of the platform about its shaft 36 since its support 169 is rigidly connected with platform 37. This continues to be the case till contact arm 124 is restored to the position 128 having no counter contact, i. e. until the platform has taken up the north-south direction itself, or, in other words, till the shaft 44 of the stabilizing gyro 40 runs parallel to the shaft 49 of the compass gyro.

If the platform 37 is not clearly in a north-south direction when the gyros begin to work, it is gradually adjusted to the said direction accordingly as the compass gyro 46 itself takes up the north-south direction with its shaft 49. As the compass gyro, oscillating at first about the north-south direction, is known to take quite a time before it adjusts itself definitely to this direction, the platform 37, in order to reduce the required time, may, at least approximately, be set by hand, to the north-south direction by a previous comparison with any other compass. It then only remains for the compass gyro to effect an accurate adjustment and to keep the platform in the north-south direction. The possible oscillations of the gyro about shaft 47 are dampened, so as to be dead beat, by the eddy current brake whose coil 138 is supplied with current through the D. C. conductors + and —.

As the gyro body 140 of the compass gyro 46, in order to be able to operate as such, must be arranged to oscillate about a horizontal shaft 113, 114, an oscillation of this shaft would have to take place in the case of all horizontal accelerations not occurring exactly in the direction of the said shaft. The gyro would respond thereto by precessing about shaft 47 with the result that shaft 49 would leave the north-south direction and control the azimuth gyro 50 by operating the contacts 124, 126, and 127 respectively, and thereby also move the platform 37 out of the north-south direction. This is prevented by an interruption of the control circuit +; 121, 123, 124, 126 and 127, 176″, — respectively by the contact arm 121 leaving the counter contact 123 as soon as the gyro frame 112 is displaced from its vertical position. Although the platform is hereby prevented from being displaced from its correct position in response to horizontal acceleration, the oscillating motion of the gyro might produce a disturbing effect. Such motion is dampened, however, by the action of the eddy current brake 132, 138 upon the precession axis 47. Now, this eddy current dampening would only be capable of reducing the time the gyro requires to be restored to its rest position once it has begun its oscillation motion. The intention, however, is to cause the gyro not to make any, or only inconsiderable, oscillation movements in response to horizontal acceleration or, in other words, the force producing the oscillation shall be counteracted immediately by a force capable of compensating the effect of the former, wholly or at least partly, immediately the gyro begins to swing to and fro.

As described above, it is for this purpose that the gyro box 115 in frame 112 is arranged eccentrically with the shaft 116, 117, and that the counterweight 139 with the necessary parts is provided. Thus, if, for example, the gyro frame 112, when acted upon by a horizontal acceleration, oscillates backwards and at right angles to the drawing plane, then the gyro box 115 will oscillate about the shaft 116, 117, and be displaced from the plane of frame 112 in a likewise backward direction. This gives rise to a precession tending to prevent the gyro frame from deflecting when the gyro body 140 (in Fig. 9) rotates counterclockwise. At the same time the counterweight 139 tends to deflect backwards and thereby to turn, through spring 142, the disc 132, and with same the arms 130 and 129 and the shaft 47, in clockwise direction, seen from above, i. e. opposed to the direction in which the precession tends to take place under the influence of the oscillating gyro frame.

Hence, it is evident that by a correct dimensioning of the masses, lengths of the lever arms, etc. the oscillating motion under the action of horizontal accelerations of the whole system can be compensated or at least suppressed to a very considerable degree. Due, however, to the low position of springs 120 and 142 as well as the low position of the centre of gravity of the gyro, all parts are restored to their initial positions from which they may have been displaced.

As already described above, the compass gyro is fitted with a device for compensating the apparent rotation of the earth. This apparent rotation results from the fact that the craft equipped with the apparatus according to the present invention moves over the surface of the earth which latter thus appears to be rotating backwards below the craft. The apparent rotation of the earth may be regarded as having two components, one with north-south direction and one with east-west direction. The east-west component of the apparent rotation of the earth does not cause a deviation of the compass from the north-south direction since this component is either added to, or subtracted from, the true rotation of the earth depending upon the course direction. The north-south component of the apparent rotation of the earth, however, causes such a moment on the gyro compass that the latter tends, under the influence of this moment, to position itself transverse to the north-south direction (parallel to the axis of the north-south component of the apparent rotation of the earth). Therefore, it is necessary to compensate at the gyro compass the moment originating from the north-south component of the apparent rotation of the earth in order to cause the gyro compass to keep its north-south direction.

The correction is controlled by the transmitter 457 (see Fig. 21) which, as described above, is rotated in accordance with the east-west portion of the said motion. The motion of the transmitter 457 is transmitted through conductors $c1$, $c2$, $c3$ (Fig. 26) also to the receiver 677 which thereby rotates the worm 699 and correspondingly also the sector 681. If in the rest position, i. e. with the gyro not precessing, the arrangement is such that the direction of the thread drive 695 is parallel to that of lever 673. The lever 691 and the thread drive 695 will, in the case of sector 681 taking up a different position due to receiver 677, likewise take up a different direction and exert a definite torque on shaft 47 through lever 673, as long as the sector 681 is outside its centre position. Thus, depending on the sense of this torque, the precession moment of the compass gyro 46 about shaft 47 for correcting the apparent rotation of the earth, will either increase or decrease.—The device, therefore operates in the same manner as the corresponding device on the north-south stabilizing gyro 40, as will be described later.

It has already been explained how the compass gyro 46 acts upon the azimuth gyro 50 with the aid of the contact device 121–127 to the effect that the platform 37 is maintained in the north-south direction by the said azimuth gyro. As this influence is due to electric current impulses, there will be a certain risk that the azimuth gyro begins to oscillate on account of frequently repeated impulses at the moment generator 176″, 177″, and that the platform thus does not maintain its correct position.

A considerable percentage of the relative motion of the compass gyro to the platform, which causes these current pulses, results from the influence exerted by the earth's true rotation. It is easy to understand that such influence is proportional to the sine of the geographical latitude of the particular place at which the craft equipped with the apparatus of the present invention happens to be at any particular moment. Since the impulse shaft of the compass gyro, on the one hand, and thus also the azimuth gyro shall always be parallel to the meridian, the meridians at the equator, on the other hand, are parallel to each other, the true earth rotation will not exert any influence on a craft proceeding along the equator. The greater, however, the geographical latitude of the parallel of the earth on which the craft is proceeding, the more do the meridians converge. Hence, the influence of the true rotation is bound to increase towards the poles, and due to the spherical shape of the earth this increase takes place in accordance with the sine law.

With the aid of the contrivance accommodated in the case 146 (see Fig. 11) the influence of the true earth rotation, instead of making itself felt by repeated current pulses, can be made to produce a more or less permanent torque. The said device corresponds, as already stated above, to those parts in Figs. 5 and 6 which operate in conjunction with receiver 78. The corresponding parts of the azimuth gyro are marked with the same reference numbers as in Figs. 5 and 6 except that they have been primed.

If the azimuth gyro happens to be in such a position that its impulse shaft 52 is in the correct position, i. e. directed north-south without a precession taking place, the lever arm 74' which correspondingly is fixed to shaft 51 (see Fig. 11) and the lever 92' will be in such a position that the tension of the thread drive 96' does not exert any torque on the shaft 51. In other words, the lever arm 74' and the connecting line between the centres of the rollers 76' and 94' are parallel to each other. The receiver 78', as already described, is controlled by the transmitter 301 which may be adjusted by means of the device shown in Figs. 12, 13. A turning of the handwheel 334 to such an extent that the pointer 337 on scale 338 is on the division corresponding to the geographical latitude of the craft, causes the transmitter 301 to be actuated in proportion to the sine of the latitude. Also the receiver 78' operates which, in turn, actuates the sector 82' with equal proportionality through a worm 100'. Consequently the thread drive 96' leaves its original position and takes up an inclined position to the lever 74' thus giving rise to a torque on the shaft 51 of the azimuth gyro. The said gyro responds to this torque by a supporting moment in the bearings of its shaft 52 and thereby rotates the platform continuously to the effect that the north-south direction is maintained.

It is, of course, possible to make the actuation of the transmitter 301, i. e. its adjustment, dependent on the operation of any other part of the device, which is itself affected by the north-south component of the motion of the craft. Thus it will be possible, say, to have the shaft 333 (of the device illustrated in Figs. 12, 13) rotated by the transmitter 457.

In the system illustrated in Figs. 12, 13 the adjustment of the transmitter is effected by hand, once because the use of the apparatus for actuating the two transmitters according to the sine, or the cosine, of the geographical latitude would be highly complicated and, further, because the variation of the influence of the earth's true rotation takes place so slowly in general that an occasional manual adjustment of the apparatus will suffice to obtain the necessary accuracy.

The effect produced by the two stabilizing gyros 40 and 41 has already been dealt with in the course of the description. Both gyros are provided with horizontal impulse shafts which, however, are arranged at right angles to each other. These gyros are likewise constructed, similar to the azimuth gyro, as working gyros. They counteract any tilting motion of the platform in the following manner: if, for example, the platform tilts about the north-south axis, the gyro 41 precesses with the east-west impulse shaft 45 about its shaft 43, thereby simultaneously producing a supporting moment in the bearings of the impulse shaft 45, which tends to keep the platform in a horizontal position.

In exactly the same way the stabilizing gyro 40 would produce a supporting moment for the platform due to its precession, the very moment the platform 37 tends to tilt about an east-west axis.

Both gyros will now receive certain corrections, the north-south gyro 40 a correction for compensating the apparent rotation of the earth and the east-west gyro 41 a correction for compensating the influence of both the true and the apparent earth rotation.

The correction required for compensating the influence of the apparent rotation of the earth cannot be dispensed with, simply because in the absence of such corrections the gyros would tend to remain with their impulse shafts in a horizontal plane of the starting point. The corrections are required in order to maintain the platform 37 horizontal in relation to the point over which the craft is passing at the moment, and that even with progressive motion of the craft fitted with the apparatus described; or expressed in other words, the corrections are required in order to maintain the platform always in a position at right angles to the earth radius passing through the craft at any given moment.

The device for compensating the apparent earth rotation is illustrated in Figs. 7 and 8 referring to the north-south gyro and in Figs. 5 and 6 with respect to the east-west gyro, and has been described above. Since the action of the individual parts is analogous to that of the corresponding parts at the compass gyro 46 and the azimuth gyro 50, there is no need to deal with these devices in detail again. It is necessary, however, to point out that the receivers 77 and 77' are actuated by the transmitters 460 and 457 of the device illustrated in Figs. 21, 23. By the illustrated device the transmitter 457 is shifted from its original position in accordance with the speed prevailing in the north-south direction, and the transmitter 460 according to the speed prevailing in the east-west direction; the displacement is such that either transmitter operates its associate receiver correspondingly.

The compensation of the influence of the true rotation of the earth exerted upon the east-west gyro 41 has also been referred to in detail in connection with the azimuth gyro 50. Whereas in the case of the azimuth gyro, however, the impulse shaft lies in the north-south direction and the compensation has to be effected by transmitter 301 according to the sine of the latitude, the compensation in the case of the stabilizing gyro 41 with east-west impulse shaft obviously has to be effected according to the cosine of the latitude. The said compensation is obtained with the aid of the apparatus illustrated in Figs. 12 and 13 and already detailed in the course of the description.

Thus, with the aid of the above-described devices it is possible to maintain the platform 37 permanently horizontal and, at the same time, in a definite direction. The errors possibly resulting from bearing friction are eliminated to a very high degree by the shaking devices above described. As these shaking devices only serve to bring about constantly changing bearing movements, which has been clearly explained in the course of the description, there is no need to give a detailed account of the operation of these devices again.

In the following a description will be given referring to the operation of the two integrators 53, 54. A perfect operation of the integrators can only be obtained if they are supported by a platform permanently maintained in a horizontal position and in a definite direction.

As has already been stated, the neutral position of the horizontally oscillating mass of the integrator 53 (Fig. 14) is such that the connecting line through the centre of gravity of the said mass and through the vertical axis of rotation of the integrator runs in an east-west direction.

When the craft equipped with the apparatus of the present invention is subjected to an acceleration, the north-south component of the said acceleration results in a deflection of the mass 148 either in a clockwise or an anticlockwise direction, when seen from above. The case 152, 153 and the shaft 156 both participate in this motion. Consequently, the contact arm 170 moves out to one of the left or right contacts 173 (see Fig. 26) and thus excites the corresponding field coil 542 or 543 of the motor 302 (Figs. 29 and 15) which is thereby caused to rotate. As the motor 302 is coupled to the transmitter 303, the latter also begins to operate and supplies the armature coil of the receiver 160 at the integrator with current, the associate field 161 being permanently connected with the live conductors r and s with the result that a torque is set up which causes the armature to rotate in one direction or the other, depending on the position of the contact arm 170 and thus also the mass 148. To this torque corresponds a reaction moment of the field 161 which is connected with the mass 148 and tends to rotate in opposite direction. The sense of revolution of the motor 302, as stated above, depends on whether the contact 170 is on contacts of the left or right-hand side of the sector 172, this because the field coils 542 and 543 are wound in opposite direction. On the sense of rotation of the motor 302, however, also depends the sense of revolution of the armature 160 and of the reaction moment of field 161, considering that the star-connected windings of the armature 536 (Fig. 29) and 160 (Fig. 26) are connected with each other.

It now becomes evident that by correct dimensioning of the coils of both armature and field 160 and 161 respectively as well as the resistances 514, it can be achieved that the reaction moment of the field at any given moment is just as large and opposed in direction as the moment produced by the acceleration and acting upon the mass 148. Hence, the deflection of the mass 148 is neutralized on the one hand and an accelerating force exerted upon the armature 160 on the other hand, this accelerating force being proportional at any time to that acting upon the mass 148. Since, however, the exciting current impulses are proportional to the acceleration of the system in a north-south direction at any given moment, due to the momentary position of the contact arm 170 and the resistances 514, the time integral of the current pulses corresponds to the time integral of all these accelerations, and both the motor 302 and the armature 160 must always rotate with a speed proportional to the speed of the craft equipped with the apparatus of the present invention. In this connection, it must be borne in mind that motor 302 by no means ceases rotating when contact arm 170 is returned to its neutral position. For reasons explained in the foregoing description of the integrator shown in Fig. 14, motor 302 continues to rotate with such speed as is the result of all accelerations and decelerations which occurred since the start of the craft, until a further acceleration or deceleration alters its speed correspondingly. With the motor 302, however, constantly proportional to the speed of the craft in the north-south direction, the number of the revolutions made by motor 302 is bound to be proportional also to the distance traversed by the craft in a north-south direction. The corresponding revolution counter 350 may, therefore, be calibrated directly in miles and indicate the distance covered in the north-south direction.

If, during the above-described operation of the integrator, the contact sector 172 would be rigidly fixed on support 157, current would continue to flow to the motor 302 and the armature 160, thus causing a continued rotation in the same direction, and that in spite of a decreased acceleration; the said current would continue to flow till contact arm 170 reaches its centre position again. In the case of a further retardation and a resultant passing over of the contact arm 170 to the other side of the contact segment, a considerable braking force would be exerted upon the revolving parts before the latter would be able to rotate in the opposite direction.

To dampen the effect of such an abrupt reversal, the sector 172 is provided with the spring 182 and the eddy current brake 178, 179, 180 and connected with the armature 176 of the moment generator 176, 177 so as to be capable of rotating. When the contact arm 170 moves over one of the contacts 173, current is also fed to the armature 176 which tends to rotate itself as well as the sector 172 in opposition to the force of the spring 182 and the eddy current brake so that it follows the contact arm with a certain lag. When the acceleration diminishes, the contact arm 170 reaches the point of the segment where there are no contacts and switches off the current before the mass 148 reaches its neutral position. By a correct dimensioning of the parts and the tension of the spring 182, the current regulation for the motor 302 and thus also the receiver armature 160 can be dampened within suitable limits.

The integrator 54 operates in the same manner as the integrator 53, the only difference being that the integrator 54 responds to east-west acceleration, and, correspondingly, the instrument 351 provided on the motor 306 (Fig. 15) controlled by integrator 54, indicates the distance traversed in this direction.

From the distance components in the north-south and east-west directions respectively it is now possible to determine, say, on a chart by geometrical addition not only the actual length of the distance traversed but at the same time to fix the true direction of such distance. The position of the craft may be found by entering on the scale of the map beginning at the point of departure the distances indicated by the instruments 350 and 351, first the east-west distance and then the north-south distance or vice versa. The terminating point of the vector diagram will then represent the position of the craft and the line connecting starting and end points will indicate both length and direction of the distance covered.

This method, however, does not only cause a considerable loss of time, considering that it has to be repeated every time it is desired, during the journey, to determine the momentary position. It will, moreover, prove inaccurate in quite a number of cases, particularly in the case of long distances in which the distortion of the chart drawing is of importance.

In view of this fact a special device is connected with that part of the apparatus, which is required for communicating the corrections for the apparent earth rotation to the stabilizing gyros; the said device affords the possibility of reading off the momentary speed according to magnitude and direction. In addition, a second device is provided enabling both the distance traversed and the position of the craft to be read off.

The device mentioned first has been dealt with in connection with Figs. 21, 22, 23. Its operation is as follows:—

The motor 401 rotates at a definite constant speed and thus causes the friction discs 405 and 427 likewise to rotate with a constant speed.

Now, let us assume that no current be flowing in the receiver 407. If the two friction rollers 414, 415 are not arranged at equal distance from the centre of the friction disc 405, one roller will rotate quicker than the other. Due to this, the sleeve 409 of the differential gear, forming the nut of the screw spindle 406, will also rotate, thereby displacing the rollers 415, 515 until they reach the centre position. The receiver 407 is then fed with current from the transmitter 303 (Figs 15, 26, 29) whose speed of revolution, as stated above, is proportional to the travelling speed. Since the receiver 407, however, rotates proportionally to the transmitter 303, it also causes the spindle 406 to revolve in proportion to the travelling speed. This revolution of the spindle results in a shifting of the rollers 414, 415 from the centre position until the differential-pinion 409 which tends to take the rollers back to the centre position, rotates at exactly the same speed as the spindle 406.

It is quite evident that the distance between the centre of the differential gear 408 and the centre of the friction disc 405 rotating at a constant speed is bound to be proportional to the speed of revolution of the receiver 407 and thus also to the travelling speed in a north-south direction. The same applies correspondingly to spindle 428, differential gear 429 and receiver 453 with respect to the east-west direction.

The movements of the two devices are transmitted by the arms 417 and 431 respectively to the pin 419, 447; the distance of this pin from its centre position at any given moment is the resultant of the two displacements. The pin 447 thus indicates the magnitude of the speed on the circles 452 of the scale 448 and the travelling course on the radii 451.

The rack bars 454 and 458 are displaced simultaneously with the differential gears 408 and 429 by the same amount as these. The said bars, consequently, cause the transmitters 457 and 460 to rotate to an amount corresponding to the travelling speed. The transmitter 457, as already stated above, displaces the receiver 77' which exerts, in the manner described, a torque upon the precession axis of the stabilizing gyro 40, which corresponds to the magnitude of the said displacement. This results in a compensation of the apparent earth rotation in the north-south direction. In the same way the apparent earth rotation is compensated in the east-west direction by means of transmitter 460, receiver 77 and the accessory parts provided on the stabilizing gyro 41.

It is evident that all parts, if adequately dimensioned, will operate in the manner desired.

In order to be able to use the device (Figs. 24, 25) on which the position and thus the covered distance can be determined for any given moment, it is necessary to prepare the paper strips 475, 476 in such a manner that one strip (475) shows the distances from place to place in degrees of geographical latitude and the other (476) in degrees of geographical longitude. The receivers 473 and 474 are connected in parallel to the previously mentioned receivers (453 and 407 respectively) to the effect that they also rotate at a speed proportional to the travelling speed in the east-west and north-south direction respectively and move the corresponding paper strips. As the slide 478 is also driven by the tooth gear 484, 485, and the worm 483 serving to correct the projection is actuated by the receiver 474, it is quite evident that the centre of the graticule 477 constantly lies on the intersection of the meridians and parallels, which corresponds to the momentary position of the craft.

The interrelation of the various instruments is clearly set forth in Fig. 31 illustrating the electrical and mechanical connections of the mechanisms diagrammatically. As the diagram shows, contact 170 of integrator 53 starts motor 302 and feeds current to moment generator 176. Motor 302 drives transmitter 303 which delivers the current to receiver 160 of the integrator, and to the receivers 407 and 474 of the course and speed instrument and of the distance and location instrument respectively. Receiver 407 is mechanically connected with transmitter 457 which is also operatively connected by mechanical means with a constantly rotating motor 401. In a similar manner, contact 170' of the east-west integrator feeds motor 306 which drives transmitter 305. This transmitter excites receivers 160', 453 and 473, and transmitter 460 of the course and speed instrument is mechanically connected with receiver 453 on the one hand, and with motor 401 on the other hand. Transmitters 457 and 460 act upon the receivers 77' and 77 respectively of the stabilizing gyros, and transmitter 457 also supplies current to receiver 677 of compass gyro 46. The transmitters 300 and 301 of the latitude instrument which are operated by hand wheel 334 with drive 335 etc. excite receiver 78 of the east-west stabilizing gyro 41, and receiver 78' of the azimuth gyro 50 respectively. Finally, the moment generator 176'' of the azimuth gyro receives current over the contacts 121 and 124 of the compass gyro 46. The results which are brought about by such interconnections are stated in the aforegoing description of the various parts and do not require further explanation. In Fig. 31, the dash lines in the diagrams of the course and speed instrument and of the latitude instrument indicate the mechanical, operative connections shown and described with reference to Figs. 21 and 12 respectively.

Obviously, many modifications may be made without departing from the nature of my invention as set forth in the appended claims.

I claim:—

1. An instrument for indicating navigational factors, comprising an integrator including a swinging mass oscillatable about an axis, and capable of responding to acceleration in the direction of one component of the movements of the craft, a reversible electric motor with a field and an armature, the field being rigidly connected with the swinging mass, and the armature being freely rotatable about the axis of the swinging mass, and a contact device connected with the swinging mass to oscillate with it for the electric control of the revolutions made by the motor, depending on magnitude and direction of the oscillating deflections, and indicating means actuated in accordance with the motor revolutions.

2. An instrument for indicating navigational factors, comprising an integrator including a swinging mass oscillatable about an axis, and capable of responding to acceleration in the direction of one component of the movements of the craft, a closed cylindrical case rigidly connected with the swinging mass, the axis of said case being identical with the axis of oscillation of said swinging mass, a reversible electric motor with a field and an armature inside the case, the field being rigidly connected with the case, and the armature being freely rotatable coaxially in the case, and a contact mechanism connected with the swinging mass for controlling the motor, and indicating means actuating in accordance with the motor revolutions.

3. An instrument for indicating navigational factors, comprising an integrator including a swinging mass oscillatable about an axis, a closed cylindrical case rigidly connected with the swinging mass, the axis of said case being identical with the axis of oscillation of said swinging mass, a reversible electric motor with a field and an armature inside the case, the field being rigidly connected with the case, and the armature being freely rotatable coaxially in the case, an inertia mass inside the case and rigidly connected with the armature of the motor, and a contact mechanism connected with the swinging mass for controlling the motor, and indicating means actuated in accordance with the motor revolutions.

4. An instrument for indicating navigational factors, comprising an integrator including a swinging mass oscillatable about a vertical axis, a reversible electric motor with a field and an armature, the field being rigidly connected with the swinging mass, and the armature being freely rotatable coaxially with the swinging mass, and a contact mechanism connected with the swinging mass for controlling the motor, and indicating means actuated in accordance with the motor revolutions.

5. An instrument for indicating navigational factors, comprising an integrator including a swinging mass oscillatable about an axis, a shaft for said swinging mass, a reversible electric motor with a field and an armature, the field being rigidly connected with the swinging mass, and the armature being freely rotatable coaxially with the swinging mass, a contact arm rigidly connected with the shaft of the swinging mass, a sector having countercontacts for the contact arm on either side of a centre position free from contacts, the successive countercontacts on either side of the sector being successively connected with each other through resistances, and means for supplying the motor with current, dependent on the position of the contact arm opposite the sector, and indicating means actuated in accordance with the motor revolutions.

6. An instrument for indicating navigational factors, comprising an integrator including a swinging mass oscillatable about an axis, a shaft for said swinging mass, a reversible electric motor with a field and an armature, the field being rigidly connected with the swinging mass, and the armature being freely rotatable coaxially with the swinging mass, a contact arm on the shaft of the swinging mass, a sector with countercontacts for the contact arm, a moment generator with a field and an armature, the sector being rigidly connected with the armature of the moment generator and resiliently attached to a stationary part and means for supplying the motor and the moment generator with current, dependent on the position of the contact arm opposite the sector, and indicating means actuated in accordance with the motor revolutions.

7. An instrument for indicating navigational factors, comprising an integrator including a stationary part, a swinging mass oscillatable about an axis, a shaft for said swinging mass, a reversible motor with a field and an armature, the field being rigidly connected with the swinging mass, and the armature being freely rotatable coaxially with the swinging mass, an inertia mass in connection with the armature of the motor, a contact arm on the shaft of the swinging mass, a rotatable sector with countercontacts and resiliently attached to the stationary part, a moment generator with a field and an armature, the armature of the moment generator being rigidly connected with the sector, an eddy current brake in connection with the armature of the moment generator, and means for supplying the motor and the moment generator with current, dependent on the position of the contact arm opposite the sector, and indicating means actuated in accordance with the motor revolutions.

8. An instrument for indicating navigational factors, comprising an integrator including a swinging mass oscillatable about an axis, and capable of responding to acceleration in the direction of a component of the movements of the craft, a shaft for said swinging mass, a closed cylindrical case rigidly connected with the shaft of the swinging mass and arranged coaxially with same, a reversible electric motor with a field and an armature inside the case, the field being rigidly connected with the case, and the armature being freely rotatable coaxially with the case, a contact mechanism connected with the swinging mass for controlling the motor, and shaking devices in connection with the shaft of the swinging mass, and indicating means actuated in accordance with the motor revolutions.

9. An instrument for indicating navigational factors, comprising the combination of an integrator including a swinging mass, an inertia mass, and controlling means, with a reversible motor, said controlling means being adapted to control the motor, dependent on magnitude and direction of the deflections of the swinging mass, said swinging mass and said inertia mass being arranged coaxially and rotatably relative to each other, means for driving the inertia mass synchronously with the motor, at least a part of said driving means being connected with said swinging mass, and indicating means actuated in accordance with the motor revolutions.

10. An instrument for indicating navigational factors, comprising the combination of an integrator including a swinging mass, an inertia mass, a receiver, and controlling means, with a reversible motor, said controlling means being adapted to control the motor, dependent on the deflections of the swinging mass, a transmitter driven by the motor and driving the receiver, and indicating means actuated in accordance with the motor revolutions, said swinging mass, said inertia mass and said receiver being arranged coaxially, part of the receiver being connected with the swinging mass, another part of the receiver with the inertia mass, and the swinging mass and the inertia mass being rotatable relatively to each other.

11. An instrument for indicating navigational factors, comprising the combination of an integrator including a swinging mass oscillatable about a vertical axis, an inertia mass, a receiver, shaking means for decreasing bearing friction, and current switching means with a reversible motor, said current switching means being adapted to supply the motor with current, dependent on the deflections of the swinging mass, said swinging mass, inertia mass and receiver being arranged coaxially, a part of said receiver being connected with the swinging mass, another part of the receiver with the inertia mass, and the swinging mass and the inertia mass being rotatable relatively to each other, a transmitter driven by the motor, means for causing the receiver to rotate in proportion to the transmitter rotations, and indicating means actuated in accordance with the motor revolutions.

12. In an instrument for indicating navigational factors, two integrators with one transmitter each operated in dependence on accelerations of the craft in east-west and north-south direction respectively, the integral of the number of revolutions of each transmitter over the time being proportional to the respective component of the distance traversed by the craft provided with the instrument, in combination with an apparatus for indicating the speed and course of the craft, comprising an indicating device, means for guiding the indicating device in two directions at right angles to each other, a scale opposite the indicating device, with radial graduations for taking speed readings and peripheral graduations for taking course readings, two receivers adapted for being operated by the said transmitters, and being rotatable in proportion to the speed of said transmitters respectively, a motor rotating at constant speed, and means for displacing the indicating device, depending on the speeds of both the receivers and the motor.

13. In an instrument for indicating navigational factors, two integrators with one transmitter each actuated in dependence on the accelerations of the craft in east-west and north-south direction respectively, the integral of the number of revolutions of each transmitter over the time being proportional to the respective component of the distance traversed by the craft provided with the instrument, in combination with an apparatus for indicating the speed and course of the craft, comprising an indicating device, means for guiding the indicating device in two directions at right angles to each other, a scale opposite the indicating device, with radial graduations for taking course readings, two receivers adapted for being operated by the said transmitters, and being rotatable in proportion to the speed of said transmitters respectively, a motor rotating at constant speed, two differential gears, each differential gear being in driving connection with one of the receivers and the motor, and means for transmitting the movements of the differential gears to the indicating device.

14. In an instrument for indicating navigational factors, two integrators with one transmitter each actuated in dependence on the acceleration of the craft in east-west and north-south direction respectively, the integral of the number of revolutions of each transmitter over the time being proportional to the respective component of the distance traversed by the craft provided with the instrument, in combination with an apparatus for indicating the speed and course of the craft, comprising an indicating device, means for guiding the indicating device in two directions at right angles to each other, a scale opposite the indicating device, with radial graduations for taking speed readings and peripheral graduations for taking course readings, two receivers adapted for being operated by the said transmitters, and being rotatable in proportion to the speed of said transmitters, a motor rotating at constant speed, two differential gears, each differential gear comprising two differential wheels in connection with friction wheels and a differential pinion with planetary wheels and a nut, two threaded spindles, each being in driving connection with one of the receivers, and engaged with the nut thread of one of the differential pinions, two friction discs in driving connection with the motor and engaging with the friction wheels of one differential gear each, and means for transmitting the movements of the differential gears to the indicating device.

15. In an instrument for indicating navigational factors, the combination of two integrators each having an oscillatable mass adapted to respond to accelerations in east-west and north-south direction respectively, a stabilizing gyro with east-west directed impulse axis, a vertical precession axis and a moment generator in connection with its precession axis, a second stabilizing gyro with north-south directed impulse axis, a vertical precession axis and a moment generator in connection with the precession axis, a compass gyro with a moment generator in connection with its vertical axis, a common movable platform, for said integrators, said stabilizing gyro, and said compass gyro, two first transmitters controlled in dependence on the deflections of said oscillatable masses respectively, a device operated by said integrators for indicating the speed and course, including a movable indicating member, two receivers actuated by said first transmitters and adapted to control said indicating member, and two second transmitters in operating connection with the indicating member, means for actuating the moment generator at the stabilizing gyro with north-south directed impulse axis and the moment generator at the compass gyro through the one second transmitter, and means for actuating the moment generator at the stabilizing gyro with east-west impulse axis through the other second transmitter.

16. An instrument for indicating navigational factors, comprising a mass oscillatable in either direction from a center or normal position, and being adapted to respond to accelerations in the direction of a component of the movement of a craft provided with the instrument, a rotor freely rotatable in relation to said mass, means connected to said oscillatable mass for accelerating said rotor, and controlling means actuated by said oscillatable mass for supplying said accelerating means with power to accelerate said rotor whereby the counter force to the force accelerating the rotor tends to return said oscillatable mass to its center position when displaced therefrom by accelerations of the craft, the number of revolutions of the rotor corresponding to the ground speed of the craft in the direction of said component.

17. An instrument for indicating navigational factors, comprising a mass oscillatable in either direction from a center or normal position and being adapted to respond to accelerations in the direction of a component of the movement of a craft provided with the instrument, a rotor freely rotatable in relation to said mass, means connected to said oscillatable mass for accelerating said rotor in the direction in which the oscillatable mass is displaced from its center position by accelerations of the craft, said oscillatable mass, said rotor and said accelerating means being coaxially arranged, and controlling means actuated by said oscillatable mass for supplying said accelerating means with power to accelerate said rotor, whereby the counter force to the force accelerating said rotor tends to return said oscillatable mass to its center position, the number of revolutions of the rotor corresponding to the ground speed of the craft in the direction of said component.

18. An instrument for indicating navigational factors, comprising an oscillatable mass adapted to respond to accelerations in the direction of a component of the movement of a craft provided with the instrument, an electric motor including an armature part and a field casing part, one of said parts being connected with said oscillatable mass, the other being a rotor freely rotatable in relation to said mass, and controlling means actuated by said oscillatable mass for supplying said electric motor with current to accelerate the rotor, whereby the counter force to the force accelerating the rotor tends to return said oscillatable mass to its center position when displaced therefrom by accelerations of the craft, the number of revolutions of the rotor corresponding to the ground speed of the craft in the direction of said component.

19. In an instrument for indicating navigational factors, the combination of two integrators each comprising a mass oscillatable about a vertical axis towards both sides of a center position, and capable of responding to accelerations in the direction of one component of the movements of the craft provided with the instrument, a reversible electric motor having a field and an armature, the said field being rigidly connected with the oscillatable mass and the armature being rotatable about the axis of the oscillatable mass, a contact device rigidly connected with the oscillatable mass for the electric control of the revolutions of the motor depending upon the magnitude and direction of the oscillating deflections, the integrators being so arranged that the radius of one oscillatable mass which corresponds to the latter's center position is at right angles to the corresponding radius of the other oscillatable mass, two members movable at right angles to each other, a motor rotating at constant speed, means for displacing one of said movable members depending on the number of revolutions of the reversible motor of one of the integrators and on the number of revolutions of said motor with constant speed, and for displacing the other one of said movable members depending on the number of revolutions of the reversible motor of the other one of the integrators and on the number of revolutions of said motor with constant speed, means for indicating the point of intersection of definite lines on said movable members, and means for indicating the displacement of said point of intersection from a center position with respect to magnitude and direction.

20. In an instrument for indicating navigational factors, the combination of two integrators each comprising a mass oscillatable about a vertical axis towards both sides of a center position, and capable of responding to accelerations in the direction of one component of the movements of the craft provided with the instrument, a receiver having a field and an armature, the said field being rigidly connected with the oscillatable mass and the armature being rotatable about the axis of the oscillatable mass, a reversible electric motor, a transmitter coupled with said electric motor, and adapted to drive said receiver, means for supplying the electric motor with current dependent on the deflections of the oscillatable mass, the integrators being so arranged that the radius of one oscillatable mass which corresponds to the latter's center position is at right angles to the corresponding radius of the other oscillatable mass, means for maintaining said integrators in definite direction, two members movable at right angles to each other, a motor rotating at constant speed, means for displacing one of said movable members dependent on the number of revolutions of the transmitter of one of the integrators and on the number of revolutions of said motor with constant speed, and for displacing said other movable member depending on the number of revolutions of the transmitter of the other integrator and on the number of revolutions of said motor with constant speed, means for indicating the point of intersection of definite lines on the movable members, means for indicating the displacement of said point of intersection from a center position with respect to magnitude and direction, and means for controlling those means which maintain the integrators in a definite direction, depending on the position of said movable members.

21. An instrument for indicating navigational factors, comprising two members movable at right angles to each other, and in combination with each of the members, means including a rotatable receiver for controlling said member according to the speed in the direction of one of the two components of the movements of a craft provided with the instrument, said receiver rotating proportionally to said speed, a transmitter adapted to actuate said receiver, a reversible motor adapted to drive said transmitter, a second receiver actuated by said transmitter and having an armature part and a field part, a mass oscillatable about an axis and adapted to respond to accelerations in the direction of the component to which the respective member is allotted, one of said parts of the second receiver being rigidly connected with said mass, the other of said parts being freely rotatable about the axis of said mass, and contact means connected with said mass for supplying said electric motor with current.

JOHANN MARIA BOYKOW.